(12) United States Patent
Kadota

(10) Patent No.: US 9,894,243 B2
(45) Date of Patent: Feb. 13, 2018

(54) NON-TRANSITORY COMPUTER-READABLE MEDIUM STORING INSTRUCTIONS AND IMAGE FORMING APPARATUS, TO PERFORM MONITORING OF STATUS INFORMATION

(71) Applicant: Brother Kogyo Kabushiki Kaisha, Nagoya-shi, Aichi-ken (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/278,235

(22) Filed: Sep. 28, 2016

(65) Prior Publication Data

US 2017/0094107 A1 Mar. 30, 2017

(30) Foreign Application Priority Data

Sep. 30, 2015 (JP) ................. 2015-194537

(51) Int. Cl.
*H04N 1/333* (2006.01)
*H04N 1/00* (2006.01)
*H04N 1/32* (2006.01)

(52) U.S. Cl.
CPC ..... *H04N 1/33346* (2013.01); *H04N 1/00042* (2013.01); *H04N 1/00061* (2013.01); *H04N 1/00079* (2013.01); *H04N 1/0083* (2013.01); *H04N 1/00204* (2013.01); *H04N 1/32122* (2013.01); *H04N 2201/0094* (2013.01); *H04N 2201/33364* (2013.01)

(58) Field of Classification Search
None
See application file for complete search history.

(56) References Cited

U.S. PATENT DOCUMENTS

2006/0017958 A1* 1/2006 Jackson ................ G06F 3/1209
358/1.14
2011/0296219 A1* 12/2011 Okuda ............... G03G 15/5004
713/323

FOREIGN PATENT DOCUMENTS

JP 2003-303083 A 10/2003
JP 2009-093419 A 4/2009

* cited by examiner

*Primary Examiner* — Andrew H Lam
(74) *Attorney, Agent, or Firm* — Banner & Witcoff, Ltd.

(57) ABSTRACT

A non-transitory computer-readable medium has instructions to control an information processing device to perform monitoring, the instructions causing the information processing device to perform operations including: performing a notification acquisition processing; performing a switching processing of setting a mode flag with one of a first value indicating the first mode and a second value indicating the second mode; performing, in a case where the first value is set to the mode flag, a first monitor processing including: a first reception processing of receiving first status information; and a first display processing of displaying the status indicated by the first status information; and performing, in a case where the second value is set to the mode flag, a second monitor processing including: a second reception processing of receiving second status information; and a second display processing of displaying the status indicated by the second status information.

11 Claims, 13 Drawing Sheets

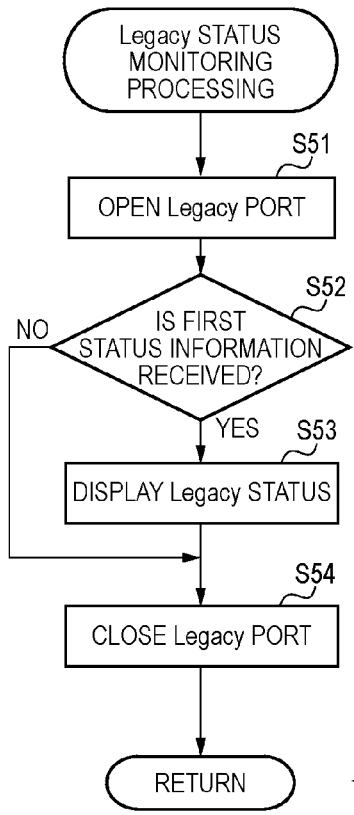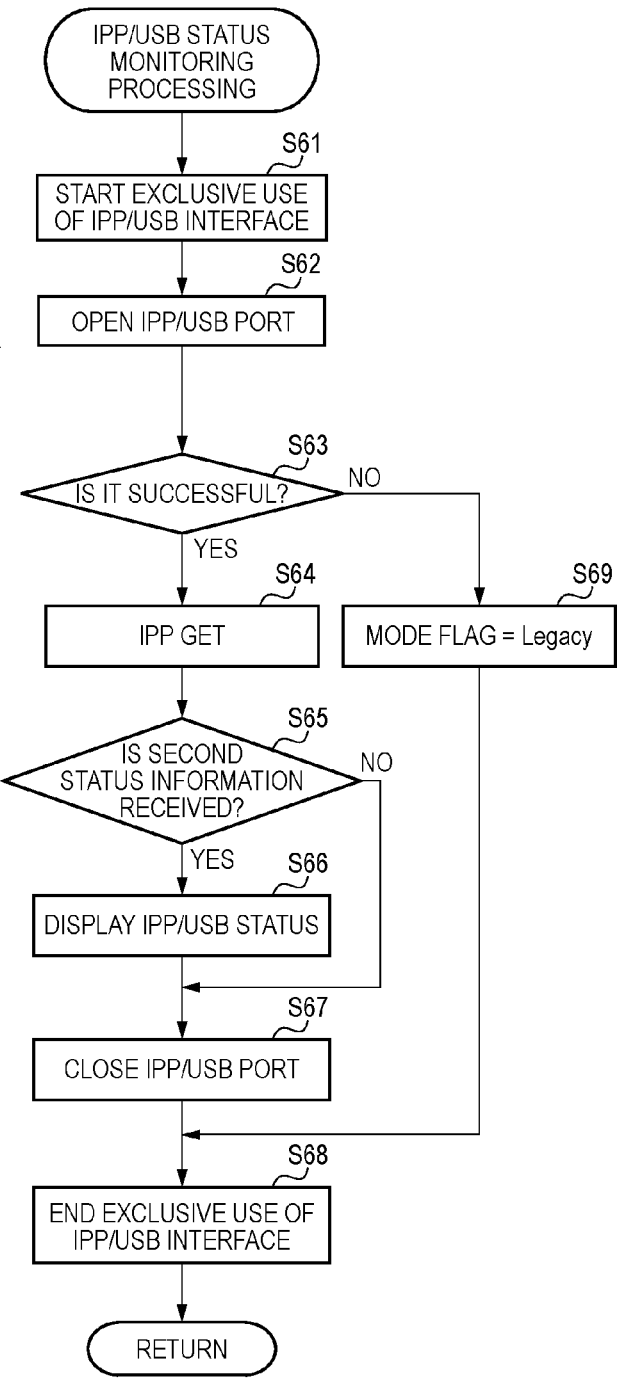

FIG. 7A

PROTOCOL SWITCHING PROCESSING

S71: IS THERE FIRST STATUS INFORMATION?
- NO → END
- YES ↓

S72: READ FIRST STATUS INFORMATION FROM FIRST AREA

S73: CONVERT READ FIRST STATUS INFORMATION INTO FORMAT OF SECOND STATUS INFORMATION

S74: WRITE CONVERTED FIRST STATUS INFORMATION IN SECOND AREA

S75: CLEAR FIRST AREA

S76: TRANSMIT ACK AS AN RESPONSE TO SET_INTERFACE

END

FIG. 7B

PROTOCOL SWITCHING PROCESSING

S81: IS THERE FIRST STATUS INFORMATION?
- NO → S87: WRITE SWITCHING INFORMATION IN SECOND AREA → END
- YES ↓

S82: READ FIRST STATUS INFORMATION FROM FIRST AREA

S83: WRITE READ FIRST STATUS INFORMATION IN SECOND AREA

S84: WRITE SWITCHING INFORMATION IN SECOND AREA

S85: CLEAR FIRST AREA

S86: TRANSMIT ACK AS AN RESPONSE TO SET_INTERFACE

END

NON-TRANSITORY COMPUTER-READABLE MEDIUM STORING INSTRUCTIONS AND IMAGE FORMING APPARATUS, TO PERFORM MONITORING OF STATUS INFORMATION

CROSS-REFERENCE TO RELATED APPLICATION

This application claims priority from Japanese Patent Application No. 2015-194537 filed on Sep. 30, 2015, the entire subject matter of which is incorporated herein by reference.

TECHNICAL FIELD

The present invention relates to instructions used to monitor a status of an image forming apparatus.

BACKGROUND

In a system configured by an information processing device and an image forming apparatus such as a printer, there is a technique in which the information processing device acquires and displays status information indicating the status of the image forming apparatus. For example, in a system in which a host computer and a printer are connected through a USB interface, when a status acquisition command is received from the host computer, a status of the printer itself is notified to the host computer.

SUMMARY

Communication between an information processing device and an image forming apparatus is realized by a plurality of protocols such as a PJL (registered trademark of Hewlett-Packard Company) and an IPP over USB (hereinafter, referred to as "IPP/USB"). In addition, the information processing device and the image forming apparatus are able to communicate through the plurality of protocols by exclusively switching a mode of a communication line. Then, status information transmitted from the image forming apparatus is different in content and reception order depending on the protocols.

This disclosure is to provide a monitor program which is able to appropriately display a status of the image forming apparatus for each protocol.

A non-transitory computer-readable medium has monitor instructions to control an information processing device to perform monitoring, the information processing device including memory, a communication interface connectable to a communication line, and a display.

The monitor instructions causing the information processing device to perform operations includes: performing a notification acquisition processing of acquiring, from communication instructions executed by the information processing device, a switching notification indicating a switching from one of a first mode and a second mode to the other mode, wherein the communication instructions executed by the information processing device uses a logical communication channel provided in the communication line by exclusively switching the first mode and the second mode, the first mode is a mode in which the communication is able to be made by a procedure compliant with a first protocol and the second mode is a mode in which the communication is able to be made by a procedure compliant with a second protocol; performing a switching processing of setting a mode flag with one of a first value indicating the first mode and a second value indicating the second mode according to the switching notification acquired in the notification acquisition processing; performing, in a case where the first value is set to the mode flag, a first monitor processing including: a first reception processing of receiving first status information indicating a status of the image forming apparatus operated in the first protocol from the image forming apparatus through the communication channel in the first mode by a procedure compliant with the first protocol; and a first display processing of displaying the status indicated by the first status information in the display; and performing, in a case where the second value is set to the mode flag, a second monitor processing including: a second reception processing of receiving second status information indicating a status of the image forming apparatus operated in the second protocol from the image forming apparatus through the communication channel in the second mode by a procedure compliant with the second protocol; and a second display processing of displaying the status indicated by the second status information in the display.

BRIEF DESCRIPTION OF THE DRAWINGS

The foregoing and additional features and characteristics of this disclosure will become more apparent from the following detailed descriptions considered with the reference to the accompanying drawings, wherein:

FIG. 6A is a flowchart of a Legacy status monitoring processing, and FIG. 6B is a flowchart of an IPP/USB status monitoring processing;

FIG. 7A is a flowchart of a protocol switching processing according to a second embodiment, and FIG. 7B is a flowchart of a protocol switching processing according to a third embodiment;

FIGS. 12A and 12B are diagrams illustrating a status of a data storage area according to the second embodiment, in which FIG. 12A is a diagram illustrating a status before execution of the protocol switching processing, and FIG. 12B is a diagram illustrating a status after execution of the protocol switching processing; and FIGS. 13A and 13B are diagrams illustrating a status of the data storage area according to the third embodiment, in which FIG. 13A is a diagram illustrating a status before execution of the protocol switching processing, and FIG.

13B is a diagram illustrating a status after execution of the protocol switching processing.

DETAILED DESCRIPTION

Hereinafter, embodiments of this disclosure will be described with reference to the corresponding drawings. The following embodiments are given as merely exemplary in this disclosure, and it is a matter of course that the embodiments of this disclosure can be appropriately changed within a scope not departing from the spirit of this disclosure.

First Embodiment

Figure 1:
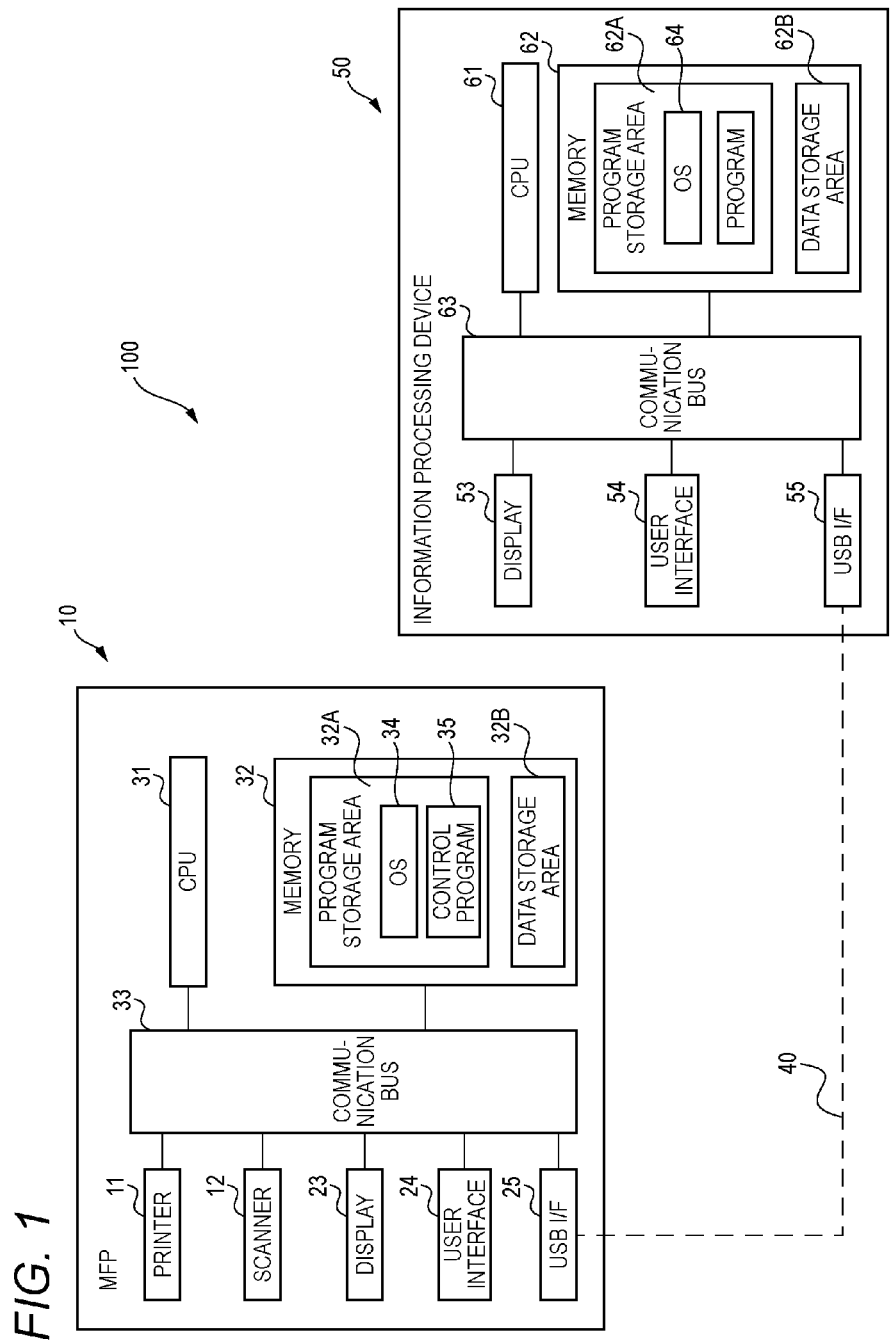
FIG. 1 is a schematic view of an image forming system according to a first embodiment.

FIG. 1 is a schematic view of an image forming system 100 according to a first embodiment. The image forming system 100 illustrated in FIG. 1 is configured by a MFP 10 and a PC 50. The MFP 10 and the information processing device 50 are connected by, for example, a USB cable 40. The USB cable 40 is an example of a communication line.

In the image forming system 100, for example, the PC 50 generates print data, and the MFP 10 records an image represented by the print data in a recording sheet. In addition, in the image forming system 100, the MFP 10 transmits status information indicating the status of the MFP 10 to the PC 50, and the PC 50 notifies the status of the MFP 10 indicated by the status information to a user. In the first embodiment, the MFP 10 operates as a USB device, and the PC 50 functions as a USB host.

In the image forming system 100 according to the first embodiment, one end of the USB cable 40 is connected to a USB interface 25 of the MFP 10, and the other end of the USB cable 40 is connected to a USB interface 55 of the PC 50, so that the MFP 10 and the PC 50 are connected to each other. The connection between the MFP 10 and the PC 50 according to the first embodiment is not limited to the USB cable 40 as long as bidirectional communication can be made. In addition, the MFP 10 and the PC 50 may be connected in a star type or a tree type as long as these devices are logically connected. In other words, the MFP 10 and the PC 50 may be connected through a USB hub.

Figure 2:
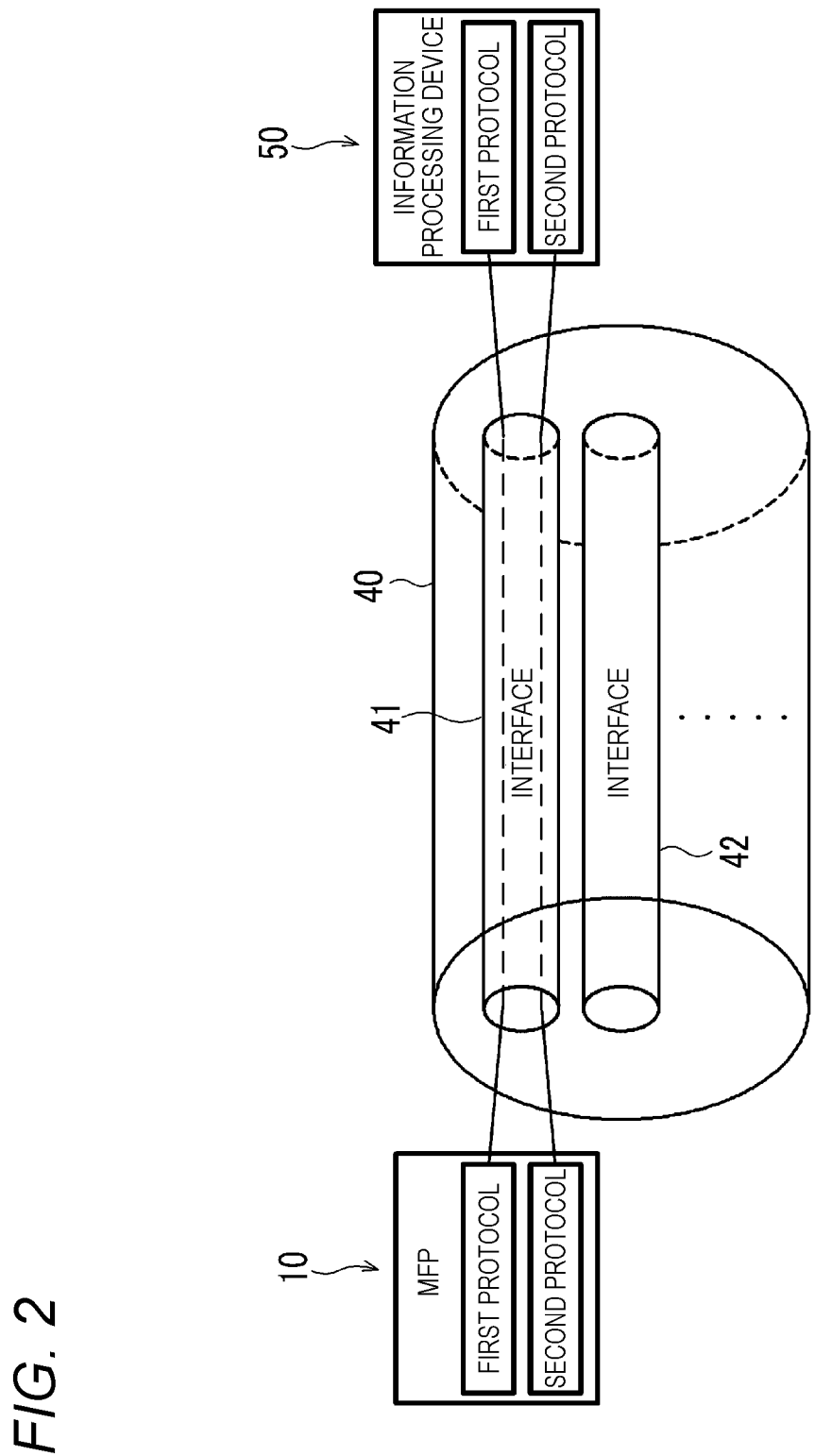
FIG. 2 is a concept view of a multi-function peripheral (MFP) and an information processing device which are connected through a USB cable.

In the USB, for example, as illustrated in FIG. 2, a plurality of interfaces 41, 42, and so on are logically provided. The interfaces 41 and 42 have a "Default setting" and "Alternate setting", and a setting of the interfaces 41 and 42 can change to each other by SET_INTERFACE command. The MFP 10 and the PC 50 are used by exclusively switching the interfaces 41 and 42 between a first mode in which the communication can be made by a procedure compliant with a first protocol and a second mode in which the communication can be made by a procedure compliant with a second protocol. The default mode of the MFP 10 and the PC 50 is the first mode. The interfaces 41 and 42 are examples of a logical communication channel. The "Default setting" of the interface 41 and 42 is used for first mode, and the "Alternate setting" is used for second mode.

The first mode indicates, for example, a status in which programs of the MFP 10 and the PC 50 recognize that information is input and output for the USB cable 40 by the procedure compliant with the first protocol. The expression "the program recognizes that the status is in the first mode" indicates, for example, a status in which a value indicating the first mode is set to a mode flag which can be referred by the program. In this specification, the communication between the MFP 10 and the PC 50 in such a status may be denoted as "the communication is executed through an interface in the first mode". The description on the second mode is also the same as above.

As the first protocol in the first embodiment, for example, a PJL is assumed. However, the first protocol is not limited to the PJL, and any protocol may be used as long as the protocol is compliant with "Universal Serial Bus Device Class Definition for Printing Device" which defines a printer class of the USB. As the second protocol in the first embodiment, for example, "IPP over USB" is assumed. The IPP over USB is compliant with "USB Print Interface Class IPP Protocol specification". Hereinafter, the first mode may be denoted as "Legacy Mode", the first protocol as "Legacy", the second mode as "IPP/USB Mode", and the second protocol as "IPP". However, specific examples of the first protocol and the second protocol, and a combination thereof are not limited to the above-described examples.

As illustrated in FIG. 1, the MFP 10 mainly includes a printer 11, a scanner 12, a display 23, an user interface 24, the USB interface (denoted by "USB I/F" in FIG. 1) 25, a CPU 31, a memory 32, and a communication bus 33. The respective components of the MFP 10 are connected to each other through the communication bus 33. The MFP 10 is an example of an image forming apparatus which forms an image. The printer 11 are examples of a printer.

The printer 11 executes a print operation by which an image represented by image data is recorded in a sheet. The recording method of the printer 11 is not particularly limited and, for example, a well-known method such as an inkjet method and an electrophotograpic method may be employed. The scanner 12 executes a scan operation in which the image recorded in the sheet is read by an image sensor such as a CIS or a CCD and the image data is generated. The MFP 10 may further execute a FAX operation in which the data is transferred through a facsimile machine and a copy operation in which the image recorded in the sheet is read and recorded to another sheet.

The display 23 includes a display screen which displays various types of information. A specific configuration of the display 23 is not particularly limited and, for example, an LCD and an Organic EL display may be employed.

The user interface 24 receives an operation of the user who designates an object displayed in the display screen of the display 23. Specifically, the user interface 24 includes buttons, and outputs various operational signals corresponding to a pressed button to the CPU 31. The user interface 24 may include a film touch sensor which is overlapped with the display screen of the display 23. In other words, the display 23 may be configured as a touch panel display. The "object" is, for example, a character string, an icon, a button, and a link displayed in the display 23.

The USB interface 25 is an interface to which the USB cable 40 is connected. The circuit of the USB interface 25 outputs a control signal according to an electrical signal input from the USB cable 40 to programs (described below), and outputs the electrical signal according to the control signal input from the programs to the USB cable 40. The USB interface 25 is an example of a communication interface.

The CPU 31 is used to control the entire operation of the MFP 10. The CPU 31 acquires the programs (described below) from the memory 32 and executes the programs based on the operational signal output from the user interface 24 and the control signal output from the USB interface 25. In other words, the CPU 31 and the memory 32 configure an example of a controller.

The memory 32 includes a program storage area 32A and a data storage area 32B. In the program storage area 32A, an OS 34 and a control program 35 are stored. The control program 35 may be a single program, or may be a set of programs. In the data storage area 32B, data or information necessary for the execution of the control program 35 is stored.

The memory 32 is configured by, for example, at least one a RAM, a ROM, an EEPROM, an HDD, a buffer of the CPU 31, or a combination thereof.

The memory 32 may be a computer-readable storage medium. The computer-readable storage medium is a non-transitory medium. In the non-transitory medium, a recording medium such as a CD-ROM and a DVD-ROM is included besides the above examples. In addition, the non-transitory medium may be a tangible medium. On the other hand, the electrical signal carrying with the program downloaded from a server on the Internet may be contained in the non-transitory computer-readable storage medium which is also the computer-readable signal medium as a kind of computer-readable medium.

The program stored in the program storage area 32A is executed by the CPU 31. However, in this specification, the description will be made about the operations of the respective programs while omitting the CPU 31. In other words, in the following description, the expression "a program A executes a processing A" indicates "the CPU 31 executes a processing A described in a program A". The PC 50 described below is also the same as above.

The OS 34 is a fundamental program which controls the printer 11, the scanner 12, the display 23, the user interface 24, and the USB interface 25 which are hardware components of the MFP 10. In other words, each program described above controls the hardware through the OS 34. However, in this specification, the description will be made about the operations of the respective programs while omitting the OS 34. In other words, in the following description, the expression "a program B controls a hardware C" may indicate "a program B controls a hardware C through the OS 34".

As illustrated in FIG. 1, the PC 50 mainly includes a display 53, an user interface 54, the USB interface 55, a CPU 61, a memory 62, and a communication bus 63. The display 53, the user interface 54, the USB interface 55, the CPU 61, the memory 62, and the communication bus 63 which are included in the PC 50 are similar in the basic configurations to those of the display 23, the user interface 24, the USB interface 25, the CPU 31, the memory 32, and the communication bus 33 which are included in the MFP 10, and thus the redundant description will not be repeated. A specific example of the PC 50 is not particularly limited and, for example, includes a portable terminal such as a tablet terminal, and a PC (the abbreviation for Personal Computer).

Figure 3:
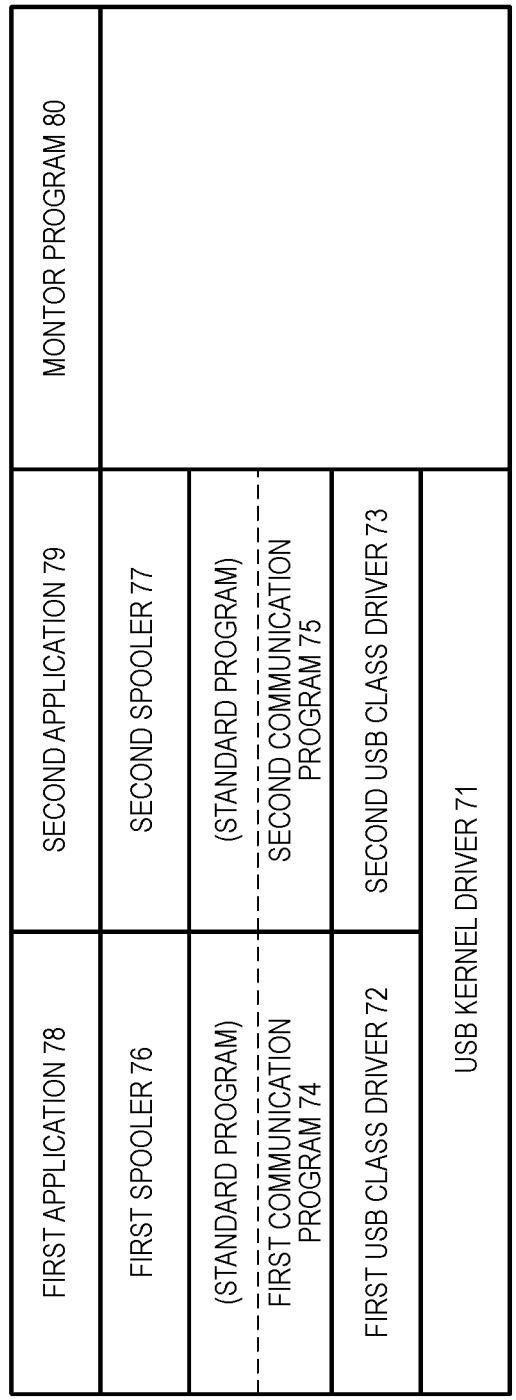
FIG. 3 is a diagram illustrating an example of a stack structure of a program for executing a print operation on the multi-function peripheral (MFP) connected through the USB cable.

A program storage area 62A stores therein an OS 64 and various types of programs illustrated in FIG. 3. The OS 64 is a fundamental program which provides APIs for controlling the display 53, the user interface 54, the USB interface 55, the CPU 61, and the memory 62 which are included in the PC 50. In addition, the OS 64 may execute a plurality of programs in parallel which are installed in the PC 50. The plurality of programs are executed in virtual parallel by, for example, a time-division multiplexing manner. In other words, the OS 64 corresponds to a so-called multithread or a so-called multitask.

As illustrated in FIG. 3, software for the communication with the MFP 10 connected through the USB cable 40 is realized as, for example, a program stack with respect to a USB kernel driver 71, a first USB class driver 72 and a second USB class driver 73, a first communication program 74 and a second communication program 75, a first spooler 76 and a second spooler 77, a first application 78, a second application 79, and a monitor program 80. The description of a standard program will be omitted from the first embodiment.

The USB kernel driver 71 executes an I/O processing, an interrupt processing, and a schedule processing. The first USB class driver 72 and the second USB class driver 73 execute an end point management and a communication protocol processing. The USB kernel driver 71, the first USB class driver 72, and the second USB class driver 73 are programs which provide a basic function for the communication with an external device through the USB cable 40, and installed in the PC 50 in standard. In other words, the first communication program 74 sends out various types of information to the USB cable 40 through the USB kernel driver 71 and the first USB class driver 72, and receives various types of information from the USB cable 40. Similarly, the second communication program 75 sends out various types of information to the USB cable 40 through the USB kernel driver 71 and the second USB class driver 73, and receives various types of information from the USB cable 40.

The first application 78 is a program which causes the MFP 10 to execute the print operation by a procedure compliant with the Legacy. The second application 79 is a program which causes the MFP 10 to execute the print operation by a procedure compliant with the IPP. More specifically, the first application 78 generates print instruction information to instruct the MFP 10 to execute the print operation, and stores the generated print instruction information in the first spooler 76. The second application 79 generates print instruction information to instruct the MFP 10 to execute the print operation, and stores the generated print instruction information in the second spooler 77. The print instruction information includes, for example, target image data of the print operation and an execution condition (for example, monochrome/color) of the print operation.

However, specific examples of the first application 78 and the second application 79 are not limited to the above examples. In other words, the first application 78 and the second application 79 are an arbitrary program, which can be installed in the PC 50, and may include a function of causing the MFP 10 to execute the print operation with respect to the edited image data or a function of receiving the image data generated by the scan operation from the MFP 10.

The first communication program 74 translates the print instruction information stored in the first spooler 76 by the first application 78 into a first page description language, and transmits the print instruction information described by the first page description language to the MFP 10 through the USB cable 40. The print instruction information described by the first page description language is an example of data which is compliant with the Legacy. The first page description language is a page description language which is used in the communication compliant with the Legacy and is assumed as, for example, PCL (registered trademark of Hewlett-Packard Company) or PS (registered trademark of Adobe Systems Incorporated).

The second communication program 75 translates the print instruction information stored in the second spooler 77 by the second application 79 into a second page description language, and transmits the print instruction information described by the second page description language to the MFP 10 through the USB cable 40. The print instruction information described by the second page description language is an example of data which is compliant with the IPP. The second page description language is a page description language which is used in the communication compliant with the IPP and is assumed as, for example, a PWG raster. The first communication program 74 and the second communication program 75 are examples of a communication program called a backend or a port monitor.

The monitor program 80 receives the status information from the MFP 10 through the USB cable 40, and displays the status of the MFP 10 indicated by the received status information in the display 53. The status indicated by the status information includes, for example, start or end of the respective operations, a residual amount of ink, jamming, and no sheet. The status information includes first status information indicating the state (hereinafter, this may be denoted by "Legacy status") of the MFP 10 which operates according to the Legacy and second status information indicating the status (hereinafter, this may be denoted by "IPP/USB status") of the MFP 10 which operates according to the IPP/USB.

A data storage area 62B stores information required at the time of executing the above programs. The data storage area 62B stores, for example, the mode flag. In the mode flag, a first value (hereinafter, denoted by "Legacy") indicating the Legacy mode or a second value (hereinafter, denoted by "IPP/USB") indicating the IPP/USB mode are set by the monitor program 80.

Figure 4:
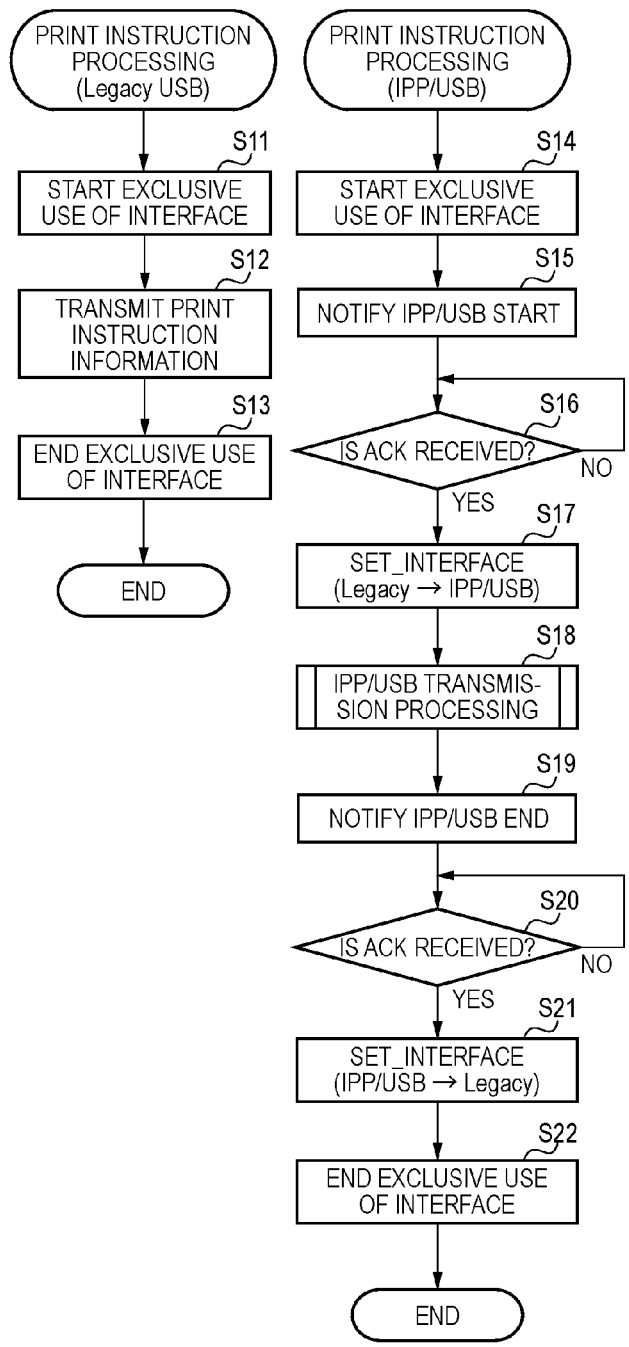
FIG. 4A is a flowchart of a print instruction processing in a Legacy mode.
FIG. 4B is a flowchart of a print instruction processing in an IPP/USB mode.
FIG. 4C is a flowchart of an IPP/USB transmission processing.
Figure 5:
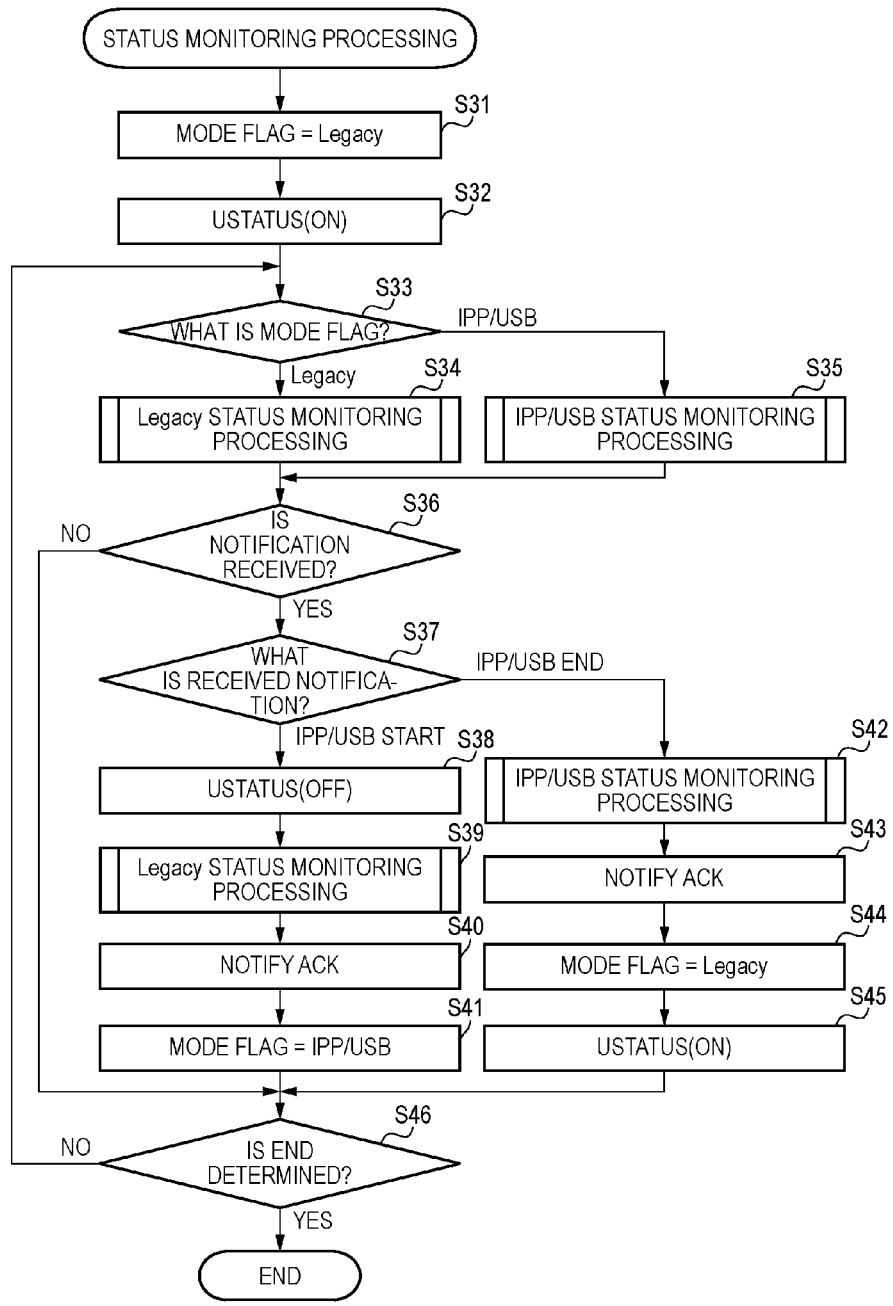
FIG. 5 is a flowchart of a status monitoring processing.

An operation of the image forming system 100 according to the first embodiment will be described with reference to FIGS. 4 to 6. In the image forming system 100 according to the first embodiment, the PC 50 causes the MFP 10 to execute the print operation, and the status of the MFP 10 executing the print operation is displayed in the display 53 of the PC 50. In this case, the operation executed by the MFP 10 is not limited to the print operation, and may be the scan operation and the FAX operation.

The first communication program 74 executes a print instruction processing illustrated in FIG. 4A in response to receiving the print instruction information from the first spooler 76. In this case, the first communication program 74 does not execute the print instruction processing illustrated in FIG. 4A until an exclusion end processing described below is executed after an exclusion start processing described below is executed by the second communication program 75.

First, the first communication program 74 executes the exclusion start processing for starting an exclusive use of the interface 41 (S11). The exclusion start processing is realized by, for example, an API for controlling a semaphore function provided by the OS 64. When the exclusion start processing is executed, for example, the second communication program 75 trying to execute the processing illustrated in FIG. 4B puts the execution of S14 on standby until an exclusive status of the interface 41 started in S11 is ended in S13. On the other hand, in a case where the processing of S14 is already performed and the interface 41 is already in the exclusive status, the first communication program 74 trying to execute the processing illustrated in FIG. 4A puts the execution of S11 on standby until the exclusive status of the interface 41 started in S14 is ended in S22.

Next, the first communication program 74 translates the print instruction information received from the first spooler 76 into the first page description language, and transmits the print instruction information described by the first page description language to the MFP 10 through the interface 41 in the Legacy mode (S12). The processing of S12 is an example of a transmission processing. The first communication program 74 transmits the print instruction information by the procedure compliant with the first protocol; for example, the "Open Legacy port process (refer to S51)" is executed before S12, and the "Close Legacy port process (refer to S54)" is executed after S12. Since the communication through the interface 41 in the Legacy mode is well known, the detailed description thereof is omitted.

Next, the first communication program 74 executes the exclusion end processing for ending the exclusive use of the interface 41 (S13). The exclusion end processing is realized by an API provided by the OS 64 for example. When the exclusion end processing is executed, the programs other than the first communication program 74 become a status in which the access to the interface 41 can be resumed. In other words, the second communication program 75 can execute the print instruction processing illustrated in FIG. 4B for example.

The second communication program 75 executes the print instruction processing illustrated in FIG. 4B in response to receiving the print instruction information from the second spooler 77. However, If "Start exclusive use of Interface" process S51 has executed, the second communication program 75 does not execute the print instruction processing illustrated in FIG. 4B until the exclusion end processing is executed after the exclusion start processing is executed by the first communication program 74.

First, the second communication program 75 starts the exclusion start processing for starting the exclusive use of the interface 41 (S14). The processing of S14 may be similar to that of S11. Next, the second communication program 75 transmits an IPP/USB start notification to the monitor program 80 through an inter-processing communication (S15). Then, the second communication program 75 puts the execution of the subsequent processing following S17 on standby until an ACK is received from the monitor program 80 through the inter-processing communication (S16: No).

The IPP/USB start notification is an example of a first switching notification indicating a switching from the Legacy mode to the IPP/USB mode. The ACK received in S16 is an example of a first allowance notification indicating an allowance of switching from the Legacy mode to the IPP/USB mode. The processing of S15 is an example of a first notification output processing. The processing of S16 is an example of a first notification acquisition processing.

Next, when the ACK is received from the monitor program 80 through the inter-processing communication (S16: Yes), the second communication program 75 transmits first switching instruction information to the MFP 10 through control transfer (S17). The first switching instruction information is an example of a first command or a switching command instructing the interface 41 to be switched from the Legacy mode to the IPP/USB mode. The transmission of the first switching instruction information is realized by executing, for example, a "SET_INTERFACE" command. The first switching instruction information is transmitted from the PC 50 to the MFP 10 through a logical pipe which is provided for the control transfer and different from the interface 41. The description on second switching instruction information described below is also the same as above. The processing of S17 is an example of a first switching processing.

Next, the second communication program 75 executes an IPP/USB transmission processing (S18). The IPP/USB transmission processing is a processing of transmitting the print instruction information described by the second page description language to the MFP 10 according to the IPP protocol through the interface 41 in the IPP/USB mode. More specifically, the second communication program 75 translates the print instruction information stored in the second spooler 77 into the second page description language, converts the print instruction information described by the second page description language into a format indicated by the IPP protocol, and transmits the print instruction information changed in format to the MFP 10 through the interface 41 in the IPP/USB mode. The details of the IPP/USB transmission processing will be described with reference to FIG. 4C.

First, the second communication program 75 executes the exclusion start processing showing that the exclusive use of the interface 41 in the IPP/USB mode starts (S23). In the exclusion start processing, a semaphore different from the exclusion start processing of S11 and S14 is used. The exclusion start processing puts the execution of the processing of S61 (described below) on standby in the monitor program 80. On the other hand, in a case where the processing of S61 is performed earlier and the interface 41 is already in the exclusive status, the second communication program 75 puts the execution of the processing of S23 on standby until the exclusive status started in S61 is ended in S68.

Next, the second communication program 75 opens an IPP/USB port (S24). Next, the second communication program 75 transmits a part of the print instruction information described by the second page description language to the MFP 10 according to the IPP protocol through the interface 41 in the IPP/USB mode (S25). The transmission processing includes a series of data transmission (POST) and response reception according to the IPP protocol. Next, the second communication program 75 closes the IPP/USB port (S26). Then, the second communication program 75 executes the exclusion end processing for ending the exclusive use of the interface 41 in the IPP/USB mode (S27). Therefore, the monitor program 80 becomes a status where the processing of S61 can be started. Then, the second communication program 75 repeatedly executes the processings of S23 to S27 until all the print instruction information described in the second page description language is transmitted (S28). Since the processings of S24 to S26 compliant with the IPP is already well known, the details will be omitted.

Returning to FIG. 4B, the second communication program 75 transmits an IPP/USB end notification to the monitor program 80 through the inter-processing communication (S19). Then, the second communication program 75 puts the execution of the subsequent processing following S21 on standby until an ACK is received from the monitor program 80 through the inter-processing communication (S20: No). The IPP/USB end notification is an example of a second switching notification indicating a switching from the IPP/USB mode to the Legacy mode. The ACK received in S20 is an example of a second allowance notification indicating an allowance of switching from the IPP/USB mode to the Legacy mode. The processing of S19 is an example of a second notification output processing. The processing of S20 is an example of a second notification acquisition processing.

Next, when the ACK is received from the monitor program 80 through the inter-processing communication (S20: Yes), the second communication program 75 transmits second switching instruction information to the MFP 10 through control transfer (S21). The second switching instruction information is an example of a second command or a switching command instructing the interface 41 to be switched from the IPP/USB mode to the Legacy mode. The transmission of the second switching instruction information is realized by executing, for example, a "SET_INTERFACE" command. The processing of S21 is an example of a second switching processing. The second communication program 75 executes the exclusion end processing for ending the exclusive use of the interface 41 (S22). The exclusion end processing is realized by, for example, the API provided by the OS 64, or may be the same processing as that of S13.

Next, a status monitoring processing executed by the monitor program 80 will be described with reference to FIG. 5. For the sake of simplicity in explanation, the monitor program will be described on assumption that the monitor program 80 is executed before the first print processing is performed after the PC 50 is activated. The status monitoring processing is a processing in which the status information is received from the MFP 10 through the interface 41, and the status indicated by the status information is displayed in the display 53. The details of the status monitoring processing will be described with reference to FIG. 5.

First, the monitor program 80 sets "Legacy" to the mode flag (S31). Next, the monitor program 80 transmits start instruction information to the MFP 10 through the interface 41 in the Legacy mode (S32). The start instruction information is information for instructing the MFP 10 to start generating the first status information. The processing of S32 is realized by, for example, a "USTATUS(ON)" command of the PJL. In response to receiving the start instruction information, the MFP 10 becomes a mode in which the first status information indicating the own status is transmitted as every changing of the own status. The transmission of the first status information is performed only in the case of the Legacy mode. The processing of S32 is an example of a start instruction processing. S31 and S32 are executed, for example, as an initial processing at the time of activating the monitor program 80.

Next, the monitor program 80 checks a value set in the mode flag (S33). Then, the monitor program 80 executes a Legacy status monitoring processing when the mode flag is set to "Legacy" (S33: Legacy) (S34). On the other hand, when the mode flag is set to "IPP/USB" (S33: IPP/USB), the monitor program 80 executes an IPP/USB status monitoring processing (S35).

The Legacy status monitoring processing is an example of a first monitor processing in which the first status information is received from the MFP 10 and the status indicated by the received first status information is displayed in the display 53. In addition, the processings of S51, S52, and S54 are examples of a first reception processing, and the processing of S53 is an example of a first display processing. The details of the Legacy status monitoring processing will be described with reference to FIG. 6A.

First, the monitor program 80 opens a Legacy port (S51). Next, the monitor program 80 requests the transmission of the first status information from the MFP 10 (S52). In a case where the status of the MFP 10 is changed, the MFP transmits the first status information indicating the status to the PC 50 through the interface 41 in the Legacy mode. On the other hand, in a case where the status of the MFP 10 is not changed, the MFP transmits a NULL packet (a USB packet having no data) to the PC 50 through the interface 41 in the Legacy mode.

Then, in response to receiving the first status information from the MFP 10 through the interface 41 in the Legacy mode (S52: Yes), the monitor program 80 displays the Legacy status indicated by the first status information in the display 53 (S53). On the other hand, in response to receiving the NULL packet from the MFP 10 through the interface 41 in the Legacy mode (S52: No), the monitor program 80 skips the processing of S53. Then, the monitor program 80 closes the Legacy port (S54).

While not illustrated in the drawing, in the case of failing in opening the Legacy port, the monitor program 80 may retry to open the Legacy portion by a predetermined number of times. When the opening of the Legacy port is failed, the monitor program 80 skips the processings of S52 to S54, determines that an ending condition is satisfied in S46 of FIG. 5, and thus ends the status monitoring processing.

The IPP/USB status monitoring processing is an example of an second monitor processing in which the second status information is received from the MFP 10, and the status indicated by the received second status information is displayed in the display 53. In addition, the processings of S61 to S65, S67, and S68 are examples of a second reception processing, and the processing of S66 is an example of a second display processing. The details of the IPP/USB status monitoring processing will be described with reference to FIG. 6B.

First, the monitor program 80 executes the exclusion start processing for starting the exclusive use of the interface 41 in the IPP/USB mode (S61). The processing of S61 may be similar to the processing of S23. Next, the monitor program 80 opens the IPP/USB port (S62). Then, when the opening of the IPP/USB port is successful (S63: Yes), the monitor program 80 request the transmission of the second status information from the MFP 10 (S64), and is on standby by a predetermined time (S65). The processing of S64 is realized by, for example, a "GET" command of the IPP.

Then, when the second status information is received from the MFP 10 through the interface 41 in the IPP/USB mode (S65: Yes), the monitor program 80 displays the IPP/USB status indicated by the second status information in the display 53 (S66). On the other hand, when the second status information is not received even when a predetermined time elapses (S65: No), the monitor program 80 skips the processing of S66. Then, the monitor program 80 closes the IPP/USB port (S67). The monitor program 80 executes the exclusion end processing for ending the exclusive use of the interface 41 in the IPP/USB mode (S68). The processing of S68 may be the same as that of S27.

When the opening of the IPP/USB port is failed (S63: No), the monitor program 80 does not execute the processings of S64 to S67, but sets "Legacy" to the mode flag (S69), and executes the processing of S68. While not illustrated in the drawings, in a case where the opening of the IPP/USB port is failed, the monitor program 80 may retry to open the IPP/USB port by a predetermined number of times.

Returning to FIG. 5, the monitor program 80 checks whether a notification is received from the second communication program 75 through the inter-processing communication (S36). Then, when the notification is not received from the second communication program 75 (S36: No), the monitor program 80 skips the processings of S37 to S45, and determines whether the ending condition is satisfied (S46). As a case where the ending condition is satisfied, for example, there are a case where a critical error occurs and thus the processing cannot be continued, and a case where the ending of the monitor program 80 is instructed by the user of the PC 50. Then, when the ending condition is not satisfied (S46: No), the monitor program 80 executes the subsequent processing following S33 again after a predetermined time elapses. On the other hand, when the ending condition is satisfied (S46: Yes), the monitor program 80 ends the status monitoring processing.

When the second communication program 75 receives the IPP/USB start notification transmitted in S15 through the inter-processing communication (S36: Yes, and S37: IPP/USB Start), the monitor program 80 transmits stop instruction information to the MFP 10 through the interface 41 in the Legacy mode (S38). The stop instruction information is information for instructing the MFP 10 to stop generating the first status information. The processing of S38 is realized by, for example, a "USTATUS(OFF)" command of the PJL. The processing of S38 is an example of a stop instruction processing.

Next, the monitor program 80 executes the Legacy status monitoring processing (S39). Through this processing, all the first status information left in the MFP 10 is read out. The processing of S39 may be the same as those of S34. Next, the monitor program 80 transmits the ACK (an example of the first allowance notification) to the second communication program 75 through the inter-processing communication (S40). Through this processing, the second communication program 75 determines "YES" in S16, and transmits the first switching instruction information to the MFP 10 in S17. Next, the monitor program 80 sets "IPP/USB" to the mode flag (S41). Then, the monitor program 80 executes the subsequent processing following S46. The processing of S40 is an example of a notification output processing executed before S41, and the processing of S41 is an example of a switching processing.

When the second communication program 75 receives the IPP/USB end notification transmitted in S19 through the inter-processing communication (S36: Yes, and S37: IPP/USB End), the monitor program 80 executes the IPP/USB status monitoring processing (S42). Through this processing, all the second status information left in the MFP 10 is read out. Next, the monitor program 80 transmits the ACK (an example of the second allowance notification) to the second communication program 75 through the inter-processing communication (S43). Through this processing, the second communication program 75 determines "YES" in S20, and transmits the second switching instruction information to the MFP 10 in S21. Next, the monitor program 80 sets "Legacy" to the mode flag (S44). Next, the monitor program 80 transmits the start instruction information to the MFP 10 through the interface 41 in the IPP/USB mode (S45). Then, the monitor program 80 executes the subsequent processing following S46 in the Legacy mode.

The processing of S43 is an example of the notification output processing executed ahead of S44, and the processing of S44 is an example of the switching processing. In addition, the processing of S42 may be the same as that of S35, and the processing of S45 may be the same as that of S32.

While not illustrated in the drawing, the control program 35 of the MFP 10 is operated according to various instructions received from the PC 50 through the USB cable 40. First, in response to receiving the first switching instruction information from the PC 50 through the control transfer, the control program 35 switches the mode from the Legacy mode to the IPP/USB mode. In addition, in response to receiving the second switching instruction information from the PC 50 through the control transfer, the control program 35 switches the mode from the IPP/USB mode to the Legacy mode. When the mode is switched according to the switching instruction information, the control program 35 transmits the ACK as an response to the switching instruction information to the PC 50 through the control transfer. The processing of receiving the first switching instruction information and the second switching instruction information is an example of the reception processing.

In response to receiving the start instruction information from the PC 50 through the interface 41, the control program 35 starts generating the first status information. In other words, the first status information is generated when the MFP 10 is operated in the Legacy. On the other hand, in response to receiving the stop instruction information from the PC 50 through the interface 41, the control program 35 stops generating the first status information. In other words, the first status information is not generated even when the MFP 10 is operated in the Legacy.

In response to receiving the print instruction information described by the first page description language from the PC 50 through the interface 41 in the Legacy mode, the control program 35 causes the printer 11 to execute the print operation according to the print instruction information. In addition, the control program 35 generates the first status information at a predetermined timing, and stores the generated first status information in the data storage area 32B. In response to request for the transmission of the first status information from the PC 50, the control program 35 transmits the first status information stored in the data storage area 62B to the PC 50 through the interface 41 in the Legacy mode. This processing is an example of a first transmission processing.

In response to receiving the print instruction information described by the second page description language from the PC 50 through the interface 41 in the IPP/USB mode, the control program 35 causes the printer 11 to execute the print operation according to the print instruction information. In addition, the control program 35 generates the second status information at a predetermined timing and stores the generated second status information in the data storage area 32B. In response to request for the transmission of the second status information from the PC 50, the control program 35 transmits the second status information stored in the data storage area 62B to the PC 50 through the interface 41 in the IPP/USB mode. This processing is an example of a second transmission processing.

As described above, the monitor program 80 according to the first embodiment changes a setting value of the mode flag according to a switching notification received from the second communication program 75, and repeatedly receives the status information from the MFP 10 according to a protocol indicated by the setting value of the mode flag. As a result, the status of the MFP 10 can be appropriately displayed in the display 53 at every protocol.

In other words, the second communication program 75 executes the processing of S17 after waiting for the ending of the Legacy status monitoring processing executed in S39. Therefore, the first status information left in the MFP 10 can be received by the monitor program 80 before the interface 41 is switched from the Legacy mode to the IPP/USB mode. As a result, the status of the MFP 10 can be more appropriately displayed for every protocol. Even when the interface 41 is switched from the IPP/USB mode to the Legacy mode, the same processing is executed.

According to the first embodiment, when the mode is switched from the Legacy mode to the IPP/USB mode and from the IPP/USB mode to the Legacy mode again, it is suppressed that the first status information in the past is received by the PC 50.

In the first embodiment, the description has been made about an example in which all the information is transmitted/ received through the interface 41. However, the MFP 10 and the PC 50 may communicate by using a plurality of interfaces. In other words, part of the information to be transmitted/received through the interface 41 in the first embodiment may be transmitted/received through an interface different from the interface 41. For example, the interface to transmit/receive the print instruction information, the interface to transmit/receive the first status information and the second status information, and the interface to transmit/ receive the first switching instruction information, the second switching instruction information, the start instruction information, and the stop instruction information may be different. The description on second to fourth embodiments described below is also the same as above.

In S15 of the above embodiment, the second communication program 75 has transmitted the IPP/USB start notification to the monitor program 80 through the inter-processing communication. With this regard, at a time when the mode is switched to the IPP/USB mode, the second communication program 75 may write a predetermined value indicating the start of the IPP/USB mode in a predetermined memory area of the data storage area 32B. In addition, the monitor program 80 may determine whether the predetermined value is written in the predetermined memory area of the data storage area 32B instead of the processing of S36. The above description is also the same as a time when the IPP/USB mode in S19 is ended. In other words, the transmission of various types of the notifications through the inter-processing communication and the writing of various types of the notifications in the data storage area 32B are examples of the outputting various types of the notifications. Similarly, the reception of various types of notifications through the inter-processing communication and the reading of various types of the notifications from the data storage area 32B are examples of the acquisition of various types of the notifications.

Second Embodiment

Next, the processing of the MFP 10 according to a second embodiment will be described with reference to FIGS. 7A, 12A, and 12B. The details of the common portions to the first embodiment will be omitted, and the description will be made focusing on differences. The monitor program 80 according to the first embodiment performs the processing of reading the status information left in the MFP 10 in S39 and S42 before the mode flag is switched. With this regard, in the second embodiment, the MFP 10 received the switching instruction information from the PC 50 converts the status information left therein into a protocol used in the mode instructed by the switching instruction information, and transmits the information to the PC 50. Therefore, the PC 50 can read out the status information left in the MFP 10 at the time of mode switching.

Figure 12A:
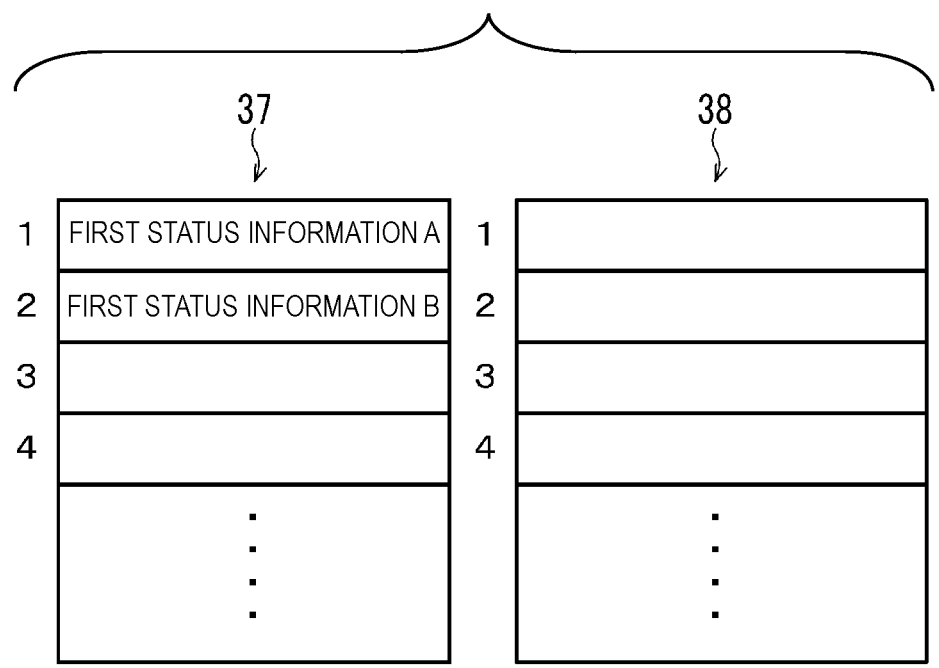
Figure 12B:
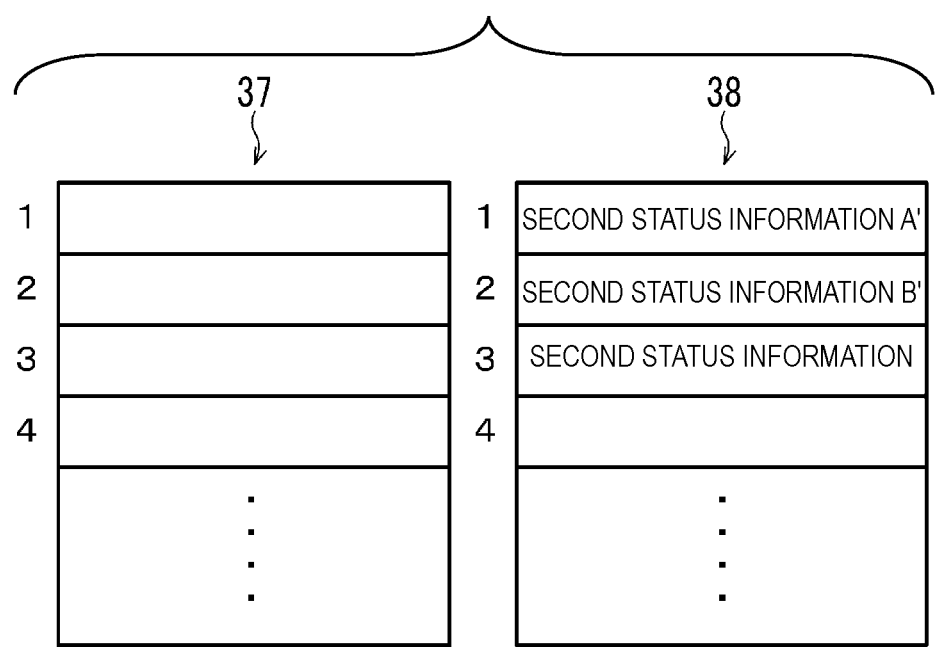

The data storage area 32B according to the second embodiment includes a first area 37 and a second area 38 as illustrated in FIGS. 12A and 12B. The first area 37 is an area where the first status information is stored among the status information generated by the control program 35. The second area 38 is an area where the second status information is stored among the status information generated by the control program 35. The first area 37 and the second area 38 are storage areas used as a so-called queue. In other words, the control program 35 reads the status information stored in the first area 37 or the second area 38 in an order of writing and then transmits the read-out information to the PC 50.

The control program 35 of the MFP 10 according to the second embodiment is assumed to be operated in the Legacy mode. In addition, in the first area 37, as illustrated in FIG.

12A, first status information A and first status information B generated by the control program 35 operated in the Legacy mode are assumed to be stored. Then, in response to receiving the first switching instruction information from the PC 50 through the control transfer, the control program 35 executes a protocol switching processing 1 as illustrated in FIG. 7A.

First, the control program 35 determines whether the first status information is stored in the first area 37 (S71). Then, when it is determined that the first status information is stored (S71: Yes), the control program 35 reads the first status information from the first area 37 (S72). In the second embodiment, the first status information A and the first status information B are read out in this order. Next, the control program 35 converts the first status information read out in S72 into the format of the second status information (S73). The processings of S72 and S73 are examples of the conversion processing.

In the example of FIG. 12B, the control program 35 generates second status information A' which indicates substantially the same content as that of the first status information A and has a format compliant with the IPP, and second status information B' which indicates substantially the same content as that of the first status information B and has a format compliant with the IPP. The expression "substantially the same" means that the status information is converted into the status information having the most approximate status in a case where there is no status information showing exactly the same status in the IPP and the Legacy for example.

Next, the control program 35 stores, as illustrated in FIG. 12B, the second status information A' and the second status information B' generated in S73 in the second area 38 in the read-out order in S72 (S74). The processing of S74 is an example of a storage processing. In addition, the control program 35 erases the first status information stored in the first area 37 (S75).

Then, the control program 35 switches the mode from the Legacy mode to the IPP/USB mode, and transmits the ACK as an response to the switching instruction information to the PC 50 through the control transfer (S76). The processing of S76 is an example of the switching processing. On the other hand, when it is determined that the first status information is not stored (S71: No), the control program 35 skips the processings of S72 to S75 and executes the processing of S76.

Thereafter, the control program 35 is operated in the IPP/USB mode, and sequentially stores the second status information behind the second status information B' of the second area 38. Then, in response to request for the transmission of the second status information from the PC 50, the control program 35 sequentially transmits the second status information A', the second status information B', and the second status information stored in the second area 38 to the PC 50 through the interface 41 in the IPP/USB mode. In FIG. 7A, although the description has been made about a processing when the first switching instruction information is received, the same processing is executed when the second switching instruction information is received. In this case, the second status information stored in the second area 38 is converted into a format compliant with the Legacy, and stored in the first area 37.

The second communication program 75 according to the second embodiment executes the print instruction processing from which S16 and S20 are omitted. In other words, after transmitting the IPP/USB start notification to the monitor program 80, the second communication program 75 transmits the first switching instruction information to the MFP 10 without waiting for the ACK from the monitor program 80. In addition, after transmitting the IPP/USB end notification to the monitor program 80, the second communication program 75 transmits the second switching instruction information to the MFP 10 without waiting for the ACK from the monitor program 80.

The monitor program 80 according to the second embodiment executes the status monitoring processing from which S39, S40, S42, and S43 are omitted. In other words, even when receiving the IPP/USB start notification from the second communication program 75, the monitor program 80 does not execute the Legacy status monitoring processing nor transmit the ACK to the second communication program 75. Similarly, even when receiving the IPP/USB end notification from the second communication program 75, the monitor program 80 does not execute the IPP/USB status monitoring processing nor transmit the ACK to the second communication program 75.

More specifically, in response to receiving the IPP/USB start notification from the second communication program 75 (S37: IPP/USB Start), the monitor program 80 according to the second embodiment sets "IPP/USB" to the mode flag (S41), and repeatedly executes the IPP/USB status monitoring processing (S35) in a predetermined time interval. In other words, the first status information A' and the second status information B' illustrated in FIG. 12B are sequentially received in S35 which is repeatedly executed, and displayed in the display 53 as the IPP/USB status. In addition, in response to receiving the IPP/USB end notification from the second communication program 75 (S37: IPP/USB End), the monitor program 80 according to the second embodiment sets "Legacy" to the mode flag (S44), and repeatedly executes the Legacy status monitoring processing (S34) in a predetermined time interval.

According to the second embodiment, when the mode is switched from the Legacy mode to the IPP/USB mode, the first status information of the first area 37 is converted into the second status information and stored in the second area 38. In addition, behind a status information, the second status information indicating the status of the MFP 10 operated in the IPP/USB is further stored. Therefore, the PC 50 may receive the status information stored in the second area 38 by a procedure compliant with the second protocol. Even in a case where the mode is switched from the IPP/USB mode to the Legacy mode, the same processing can be performed.

After transmitting the IPP/USB start notification and the IPP/USB end notification to the monitor program 80, the second communication program 75 according to the second embodiment can transmit the switching instruction information to the MFP 10 without waiting for the ACK from the monitor program 80. Therefore, the mode switching can be made in a speedy manner.

Third Embodiment

Next, the processing of the MFP 10 according to the third embodiment will be described with reference to FIGS. 7B, 8, 9, 13A, and 13B. The details of the common portions to the first and second embodiments will be omitted, and the description will be made focusing on differences. The monitor program 80 according to the first embodiment performs the processing of reading the status information left in the MFP 10 in S39 and S42 before the mode flag is switched. With this regard, in the third embodiment, the MFP 10 having received the switching instruction information from the PC 50 transmits the status information and switching information left therein to the PC 50 in a mode instructed by the switching instruction information. Therefore, the PC 50 can read out the status information left in the MFP 10 at the time of mode switching.

The data storage area 62B according to the third embodiment further stores a transitioned flag. In the transitioned flag, a third value (hereinafter, referred to as "OFF") indicating that the switching information is not yet received (in other words, the mode transition is in progress), or a fourth value (hereinafter, referred to as "ON") indicating that the switching information is already received (in other words, the mode transition is completed) is set by the monitor program 80.

Figure 13A:
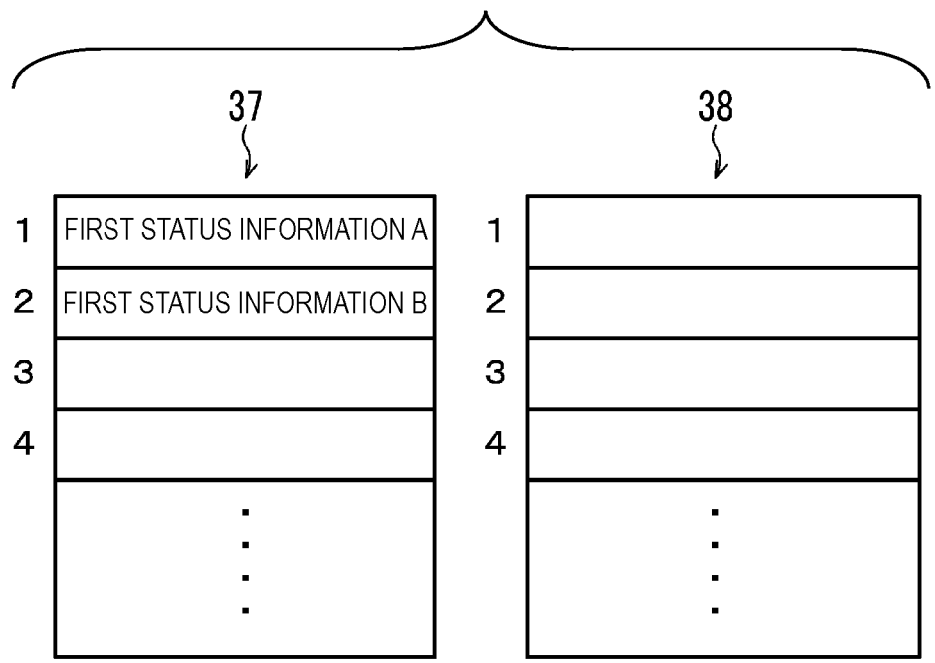
Figure 13B:
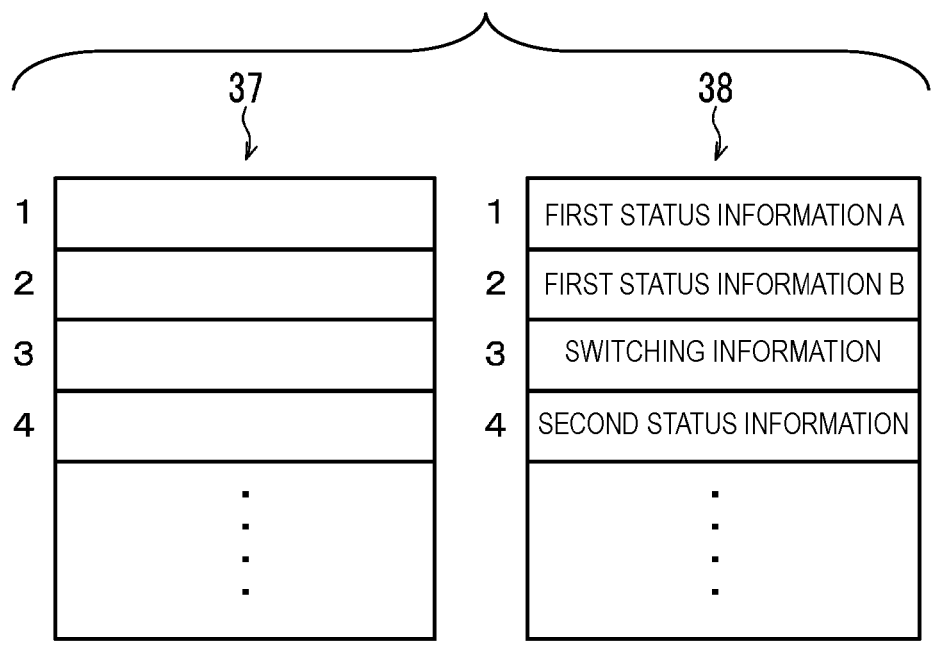

The data storage area 32B according to the third embodiment includes the first area 37 and the second area 38 as illustrated in FIGS. 13A and 13B. In addition, the control program 35 of the MFP 10 according to the third embodiment is assumed to be operated in the Legacy mode. In addition, in the first area 37, as illustrated in FIG. 13A, it is assumed that first status information A and first status information B generated by the control program 35 operated in the Legacy mode are stored. Then, in response to receiving the first switching instruction information from the PC 50 through the interface 41 in the Legacy mode, the control program 35 executes a protocol switching processing 2 illustrated in FIG. 7B.

First, the control program 35 determines whether the first status information is stored in the first area 37 (S81). Then, when it is determined that the first status information is stored (S81: Yes), the control program 35 reads out the first status information from the first area 37 (S82). In the third embodiment, the reading is made in an order of the first status information A and the first status information B. Next, the control program 35 stores the first status information read out in S82 in the second area 38 in an order of reading as illustrated in FIG. 13B (S83). The processings of S82 and S83 are examples of a first storage processing.

Next, the control program 35 writes the switching information in the second area 38 (S84). The switching information is information informing a switching from the Legacy to the IPP/USB to the PC 50. The switching information is generated in a format compliant with the IPP. In the third embodiment, the switching information is written behind the first status information B of the second area 38 as illustrated in FIG. 13B. The processing of S84 is an example of a second storage processing. In addition, the control program 35 erases the first status information stored in the first area 37 (S85).

Then, the control program 35 switches the mode from the Legacy mode to the IPP/USB mode, and transmits the ACK as an response to the switching instruction information to the PC 50 through the control transfer (S86). The processing of S86 is an example of the switching processing. On the other hand, when it is determined that the first status information is not stored (S81: No), the control program 35 writes the switching information in the second area 38 without executing the processings of S82 to S85 (S87). In other words, the switching information is written in the head of a second storage area 38. Then, the control program 35 executes the processing of S86.

Thereafter, the control program 35 is operated in the IPP/USB mode and stores the second status information behind the switching information of the second area 38. Then, in response to request for the transmission of the second status information from the PC 50, the control program 35 sequentially transmits the first status information A, the first status information B, the switching information, and the second status information stored in the second area 38 to the PC 50 through the interface 41 in the IPP/USB mode. In FIG. 7B, although the description has been made about a processing of receiving the first switching instruction information, and the same processing is executed when the second switching instruction information is received. In this case, the second status information and the switching information stored in the second area 38 are stored in the first area 37.

The second communication program 75 according to the third embodiment executes the same processings as that of the second embodiment. The monitor program 80 according to the third embodiment executes the status monitoring processing which includes an initialization processing of setting "OFF" to the transitioned flag in place of S39 and S40 and an initialization processing of setting "OFF" to the transitioned flag in place of S42 and S43. In addition, the monitor program 80 executes the Legacy status monitoring processing illustrated in FIG. 8 in S34 of FIG. 5. The monitor program 80 executes the IPP/USB status monitoring processing illustrated in FIG. 9 in S35 of FIG. 5.

Figure 8:
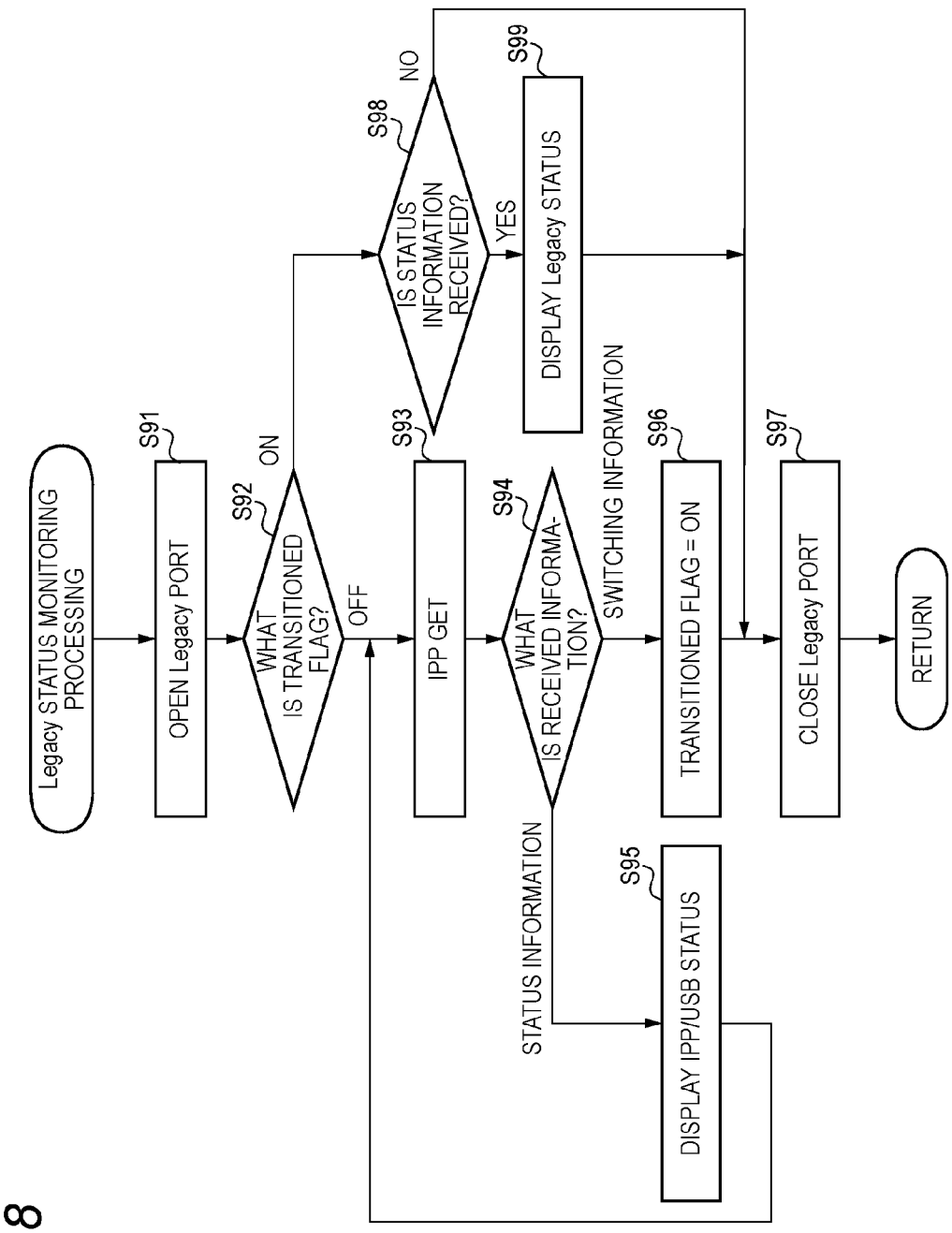
FIG. 8 is a flowchart of a Legacy status monitoring processing according to the third embodiment.

The Legacy status monitoring processing illustrated in FIG. 8 is a processing of receiving the status information ahead of the switching information as the second status information, and receiving the status information behind the switching information as the first status information. Hereinafter, the details of the common processings to those illustrated in FIGS. 6A and 6B will be omitted, and the description will be made focusing on differences. Specifically, the processings of S91, S93, S95, S97, S98, and S99 are common to those of S51, S64, S66, S54, S52, and S53.

First, the monitor program 80 opens the Legacy port (S91). Next, the monitor program 80 checks the value of the transitioned flag stored in the data storage area 62B (S92). Then, when "OFF" is set to the transitioned flag (S92: OFF), the monitor program 80 receives the information transmitted from the MFP 10 through the interface 41 in the Legacy mode, by the procedure compliant with the IPP. In other words, the monitor program 80 requests the transmission of the information to the MFP 10 through the "GET" command of the IPP (S93).

Next, the monitor program 80 checks the type of the information received from the MFP 10 through the interface 41 in the Legacy mode (S94). Then, in response to receiving the status information from the MFP 10 (S94: Status Information), the monitor program 80 recognizes said status information as the second status information. Then, the monitor program 80 displays the IPP/USB status indicated by said second status information in the display 53 (S95). Then, the monitor program 80 executes the subsequent processing following S93 again. On the other hand, in response to receiving the switching information from the MFP 10 (S94: Switching Information), the monitor program 80 sets "ON" to the transitioned flag (S96), and closes the Legacy port (S97). The processing of S96 is an example of a setting processing.

When "ON" is set to the transitioned flag (S92: ON), the monitor program 80 receives the information transmitted from the MFP 10 through the interface 41 in the Legacy mode, by the procedure compliant with the Legacy. Then, in response to receiving the status information from the MFP 10 through the interface 41 in the Legacy mode (S98: Yes), the monitor program 80 recognizes said status information as the first status information. Then, the monitor program 80 displays the Legacy status indicated by said first status information in the display 53 (S99), and closes the Legacy port (S97). On the other hand, in response to receiving the NULL packet from the MFP 10 through the interface 41 in the Legacy mode (S98: No), the monitor program 80 skips the processing of S99, and executes the processing of S97.

Figure 9:
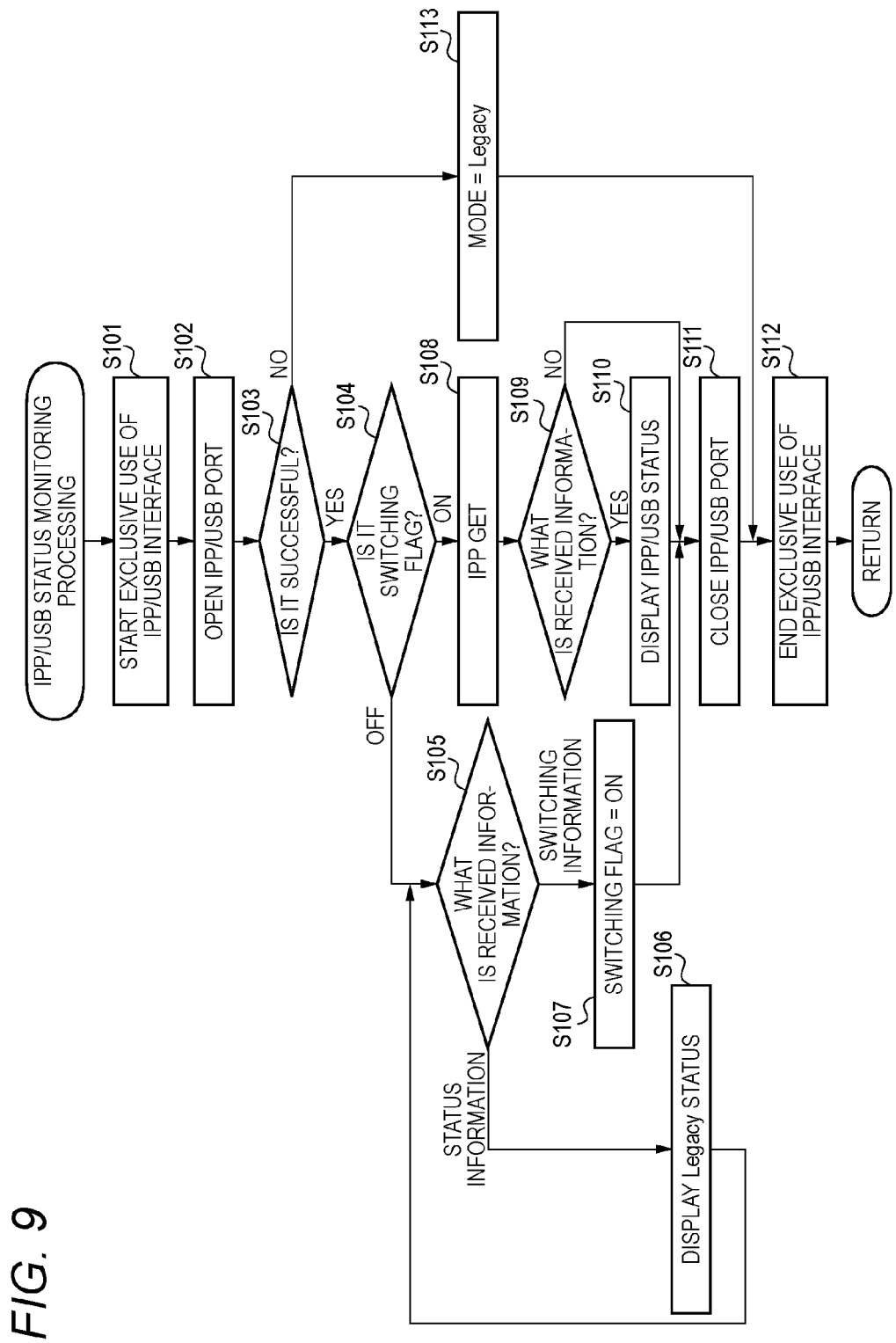
FIG. 9 is a flowchart of an IPP/USB status monitoring processing according to the third embodiment.

The IPP/USB status monitoring processing illustrated in FIG. 9 is a processing of receiving the status information ahead of the switching information as the first status information, and receiving the status information behind the switching information as the second status information. Hereinafter, the details of the common processings to those illustrated in FIGS. 6A and 6B will be omitted, and the description will be made focusing on differences. Specifically, the processings of S101 to S103, S106, and S108 to S113 are common to those of S61 to S63, S53, and S64 to S69.

First, the monitor program 80 executes the exclusion start processing (S101), and opens the IPP/USB port (S102). Then, when the opening of the IPP/USB port is successful (S103: Yes), the monitor program 80 checks the value of the transitioned flag stored in the data storage area 62B (S104). Then, when "OFF" is set to the transitioned flag (S104: OFF), the monitor program 80 receives the information transmitted from the MFP 10 through the interface 41 in the IPP/USB mode by the procedure compliant with the Legacy.

Next, the monitor program 80 checks the type of the information receive from the MFP 10 through the interface 41 in the IPP/USB mode (S105). Then, in response to receiving the status information from the MFP 10 (S105: Status Information), the monitor program 80 recognizes said status information as the first status information. Then, the monitor program 80 displays the Legacy status indicated by said first status information in the display 53 (S106). Then, the monitor program 80 executes the subsequent processing following S105 again. On the other hand, in response to receiving the switching information from the MFP 10 (S105: Switching Information), the monitor program 80 sets "ON" to the transitioned flag (S107), closes the IPP/USB port (S111), and executes the exclusion end processing (S112). The processing of S107 is an example of the setting processing.

When "ON" is set to the transitioned flag (S104: ON), the monitor program 80 receives the information transmitted from the MFP 10 through the interface 41 in the IPP/USB mode in the order to conformity to the IPP. In other words, the monitor program 80 requests the transmission of the information to the MFP 10 through the "GET" command of the IPP (S108). Then, in response to receiving the status information from the MFP 10 through the interface 41 in the IPP/USB mode (S109: Yes), the monitor program 80 recognizes said status information as the second status information. Then, the monitor program 80 displays the IPP/USB status indicated by said second status information in the display 53 (S110), closes the IPP/USB port (S111), and executes the exclusion end processing (S112).

On the other hand, in response to receiving the NULL packet from the MFP 10 through the interface 41 in the IPP/USB mode (S109: No), the monitor program 80 skips the processing of S110, and executes the processing of S111. In addition, when the opening of the IPP/USB port is failed (S103: No), the monitor program 80 sets "Legacy" to the mode flag (S113), and executes the processing of S112.

According to the third embodiment, among the status information received from the MFP 10 in the Legacy status monitoring processing, the status information received ahead of the switching information is displayed as the second status information, and the status information received behind the switching information is displayed as the first status information. In addition, among the status information received from the MFP 10 in the IPP/USB status monitoring processing, the status information received ahead of the switching information is displayed as the first status information, and the status information received behind the switching information is displayed as the second status information. As a result, the status of the MFP 10 can be more appropriately displayed for every protocol.

Fourth Embodiment

Next, the processing of the PC 50 according to the fourth embodiment will be described with reference to FIG. 10. The details of the common portions to the first to third embodiments will be omitted, and the description will be made focusing on differences. The control program 35 of the MFP 10 according to the fourth embodiment writes, for example, the status information in the data storage area 32B without distinction of the first status information and the second status information, and transmits the status information to the PC 50 in an order of writing.

The second communication program 75 according to the fourth embodiment executes the same processing as that of the second embodiment. The monitor program 80 of the PC 50 according to the fourth embodiment executes the Legacy status monitoring processing illustrated in FIG. 10 in S34. Hereinafter, the details of the common processings to those illustrated in FIGS. 6A and 6B will be omitted, and the description will be made focusing on differences. Specifically, the processings of S121, S125, S126, and S128 are common to those of S51, S53, S54, and S66.

First, the monitor program 80 opens the Legacy port (S121). Next, the monitor program 80 receives the information transmitted from the MFP 10 through the interface 41 in the Legacy mode by the procedure compliant with the Legacy (S122: Yes). Then, the monitor program 80 determines whether said information is any of the first status information and the second status information by analyzing the data structure of the information received from the MFP 10 through the interface 41 in the Legacy mode (S123).

For example, the monitor program 80 specifies "Legacy" or "IPP/USB" in S123 on the basis on the information which specifies a protocol contained in the information received in S122. For example, the monitor program 80 may determine "Legacy" when a character string of "@PJL" is contained in the information. On the other hand, the monitor program 80 may determine "IPP/USB" when a character string of "HTTP" is contained in the information. The processing of S123 is an example of a determination processing.

Next, when it is determined that the first status information is received (S123: Legacy), the monitor program 80 extracts first status information according to data structure of Legacy from the information received in S122 as the first status information (S124). Then, the monitor program 80 displays the Legacy status indicated by said first status information in the display 53 (S125), and closes the Legacy port (S126).

On the other hand, when it is determined that the second status information is received (S123: IPP/USB), the monitor program 80 extracts second status information according to data structure of IPP from the information received in S122 (S127). Then, the monitor program 80 displays the IPP/USB status indicated in said second status information in the display 53 (S128), and closes the Legacy port (S126).

According to the fourth embodiment, the status information received from the MFP 10 in the Legacy status monitoring processing is determined as any one of the first status information and the second status information by analyzing the data structure. As a result, the status of the MFP 10 can be more appropriately displayed for every protocol. In addition, according to the fourth embodiment, the processing of S71 to S75 of FIG. 7A or the processing of S81 to S85, and S87 of FIG. 7B are not essential processings to be mounted in the MFP 10.

Figure 10:
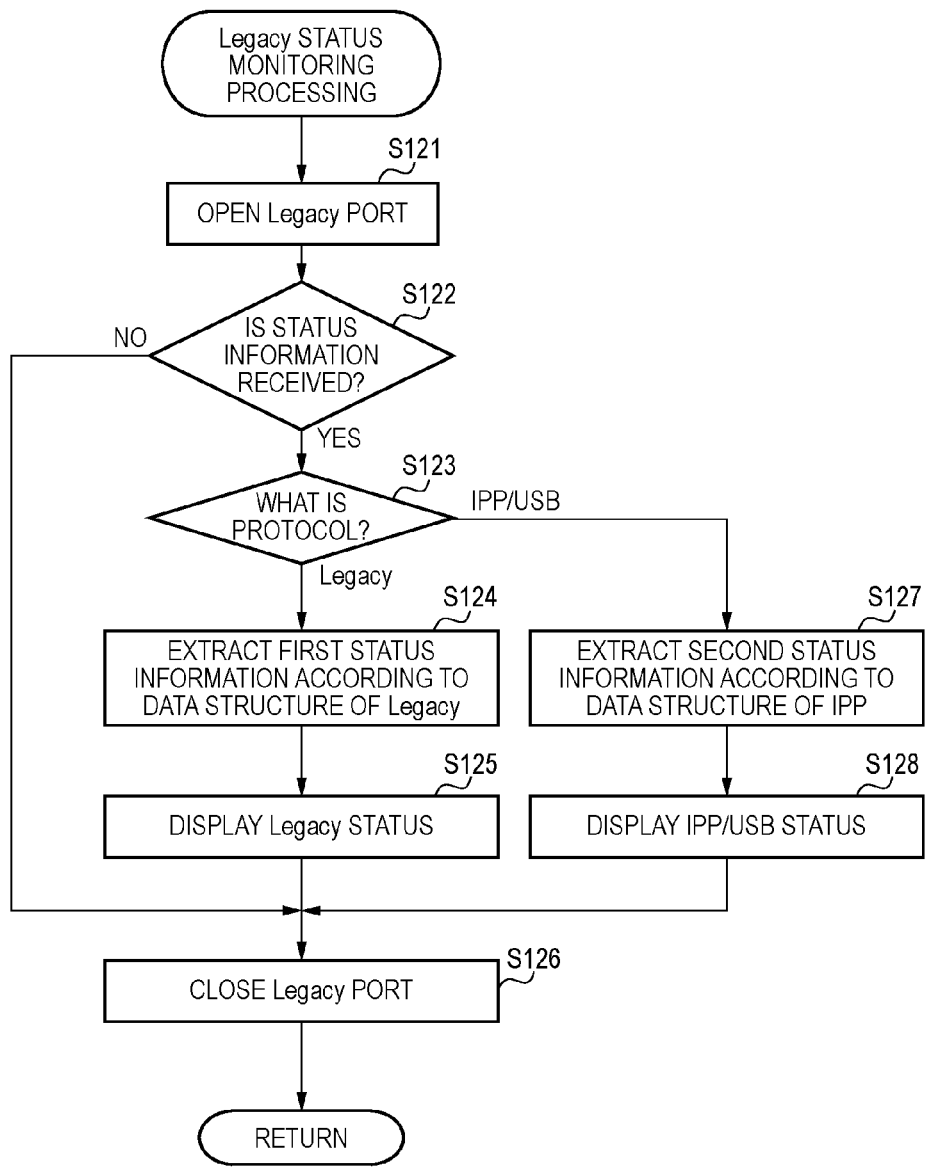
FIG. 10 is a flowchart of a Legacy status monitoring processing according to a fourth embodiment.

The IPP/USB status monitoring processing according to the fourth embodiment corresponds to a processing in which S121 is replaced with S61 to S64 and S126 is replaced with S67 and S68 among the Legacy status monitoring processing illustrated in FIG. 10. Then, the monitor program 80 may receive the information transmitted from the MFP 10 through the interface 41 in the IPP/USB mode by the procedure compliant with the IPP/USB in S122.

Fifth Embodiment

Figure 11:
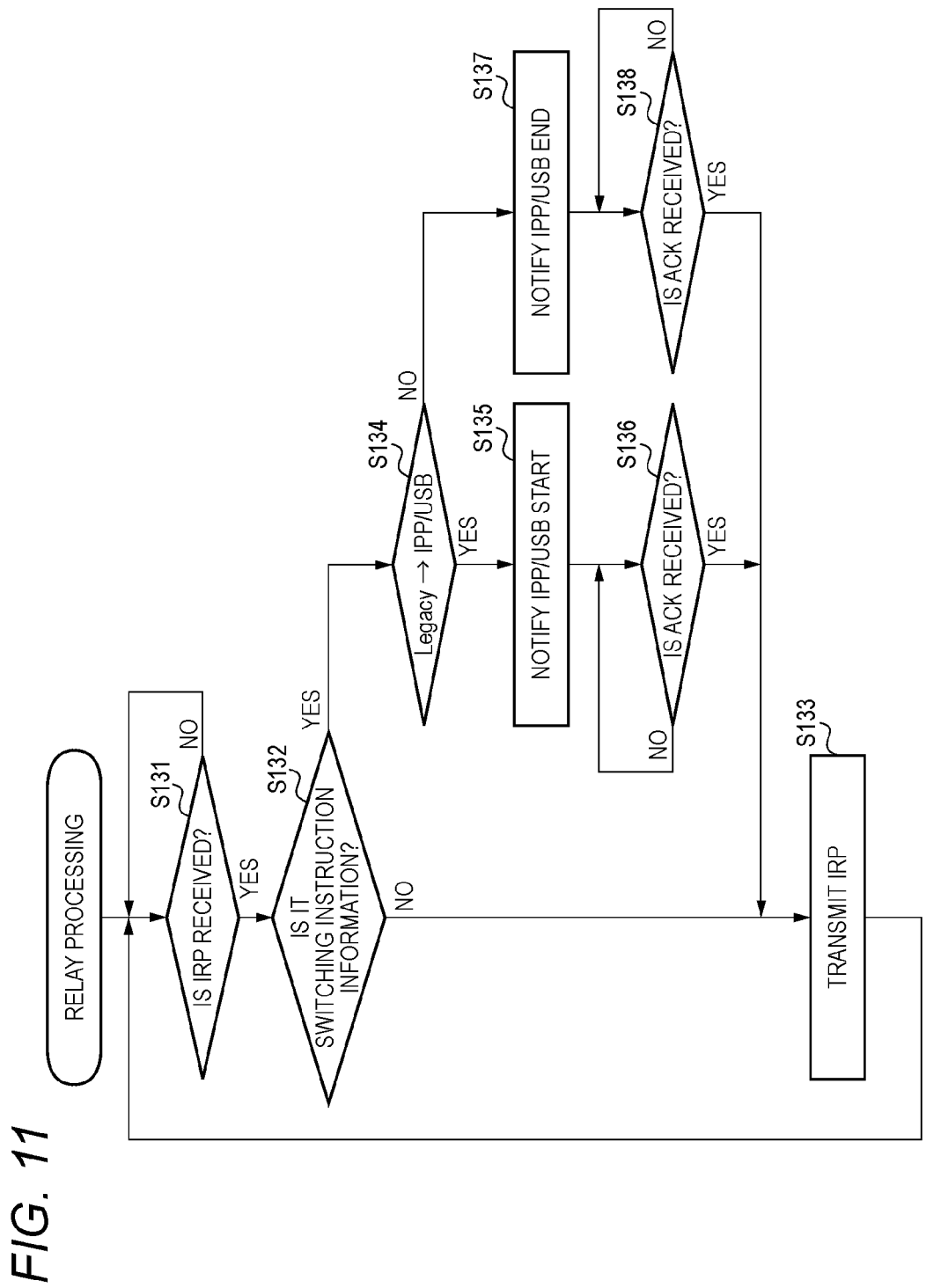
FIG. 11 is a flowchart of a relay processing according to a fifth embodiment.

Next, the processing of the PC 50 according to a fifth embodiment will be described with reference to FIG. 11. The details of the common portions to the first embodiment will be omitted, and the description will be made focusing on differences. In this embodiment, it is assumed that the printing by IPP/USB is supported by the OS 64 as a standard future and a standard port monitor for the IPP/USB is provided with the OS 62 as a standard future. As illustrated in FIG. 3, the fifth embodiment is different from the first embodiment in that the standard Legacy Port monitor program is stacked between the first communication program 74 and the first spooler 76. In addition, the fifth embodiment is different from the first embodiment in that the standard IPP/USB port monitor program is stacked between the second communication program 75 and the second spooler 77.

The standard IPP/USB port monitor program is a program provided together with the OS 64 for the communication with the MFP 10 through the USB cable 40, and executes, for example, the processings of S17, S18, and S21 illustrated in FIG. 4B. In this case, the standard program according to the fifth embodiment transmits the print instruction information read out of the second spooler 77 or an IRP not to the second USB class driver 73 but to the second communication program 75 according to the fifth embodiment.

In other words, the communication programs 74 and 75 according to the fifth embodiment function as filter drivers which are disposed in a host device of the USB class drivers 72 and 73. The USB class drivers 72 and 73 and the USB kernel driver 71 execute a processing of transferring a data object such as the IRP. The filter driver hooks the IRP transmitted from the standard port monitor program to the USB class drivers 72 and 73 in advance and executes a predetermined processing, and relays the IRP to the USB class drivers 72 and 73 after the execution of the predetermined processing.

A relay processing is a processing of performing the inter-processing communication with respect to the monitor program 80 at a timing of receiving a predetermined IRP while relaying the IRP received from the standard IPP/USB port monitor program to the second USB class driver 73. The processings of S135, S136, S137, and S138 are common to those of S15, S16, S19, and S20. The details of the relay processing executed by the second communication program 75 will be described with reference to FIG. 11.

First, the second communication program 75 according to the fifth embodiment monitors the IRP transmitted from the standard IPP/USB port monitor program (S131). Next, in response to receiving the IRP from the standard IPP/USB port monitor program (S131: Yes), the second communication program 75 determines whether said IRP is the switching instruction information (SET_INTERFACE) (S132). Then, when it is determined that the IRP is not the switching instruction information (S132: No), the second communication program 75 transmits the IRP received in S131 to the second USB class driver 73 (S133). While not illustrated in the drawing, the second communication program 75 transmits the print instruction information received from the standard IPP/USB port monitor program to the second USB class driver 73.

When it is determined that the IRP received in S131 is the first switching instruction information (S132: Yes, and S134: Yes), the second communication program 75 transmits the IPP/USB start notification to the monitor program 80 through the inter-processing communication (S135), and is on standby until the ACK is received from the monitor program 80 through the inter-processing communication (S136). Then, in response to receiving the ACK from the monitor program 80 (S136: Yes), the second communication program 75 transmits the first switching instruction information received in S131 to the second USB class driver 73 (S133).

When it is determined that the IRP received in S131 is the second switching instruction information (S132: Yes, and S134: No), the second communication program 75 transmits the IPP/USB end notification to the monitor program 80 through the inter-processing communication (S137), and is on standby until the ACK is received from the monitor program 80 through the inter-processing communication (S138). In response to receiving the ACK from the monitor program 80 (S138: Yes), the second communication program 75 transmits the second switching instruction information received in S131 to the second USB class driver 73 (S133).

According to the fifth embodiment, the processing of the first embodiment can be realized using the standard program provided by the OS 64. In other words, the second communication program 75 is not necessarily to be implemented the processing installed in the standard program, but only the unique processing to the first embodiment may be installed. Therefore, a burdon on development of the second communication program 75 is reduced.

Sixth Embodiment

Next, the processing of the PC 50 according to a sixth embodiment will be described. The details of the common portions to the first embodiment will be omitted, and the description will be made focusing on differences. The second communication program 75 according to the sixth embodiment executes the print instruction processing from which the processings of S15, S16, S19, and S20 are omitted. In other words, after executing the exclusion start processing of the interface 41, the second communication program 75 transmits the first switching instruction information to the MFP 10 without receiving the IPP/USB start notification and the ACK from the monitor program 80. In addition, after executing the IPP/USB transmission processing to the monitor program 80, the second communication program 75 transmits the second switching instruction information to the MFP 10 without receiving the IPP/USB end notification and the ACK from the monitor program 80.

The monitor program 80 according to the sixth embodiment transmits mode inquiry information to the MFP 10 through the control transfer in place of the processing of S36. The mode inquiry information is information for inquiring whether the mode of the interface 41 selected by the MFP 10 is the Legacy mode or the IPP/USB mode. The transmission of the mode inquiry information is realized by executing a "GET_INTERFACE" command for example. In place of S37, mode information sent back from the MFP 10 is received as a reply to the mode inquiry information. A processing of receiving the mode information is an example of a mode reception processing. The monitor program 80 makes a determination on the mode of the interface 41 indicated by the mode information. The monitor program 80 executes the status monitoring processing from which the processings of S39, S40, S42, and S43 are omitted. In other words, the monitor program 80 does not receive the IPP/USB start notification from the second communication program 75, and inquires of itself about the mode selected by the MFP 10.

According to the sixth embodiment, even when the IPP/USB start notification and the IPP/USB end notification are not received from the second communication program 75, the monitor program 80 itself can acquire the mode of the interface 41 from the MFP 10. Therefore, there is no need to make a synchronization with the processing of the second communication program 75, so that the processing of the program can be made simply.

The description has been exemplarily made about the MFP 10 and the PC 50 described in the above embodiment, in which the respective processings of the controller of this disclosure are realized by executing various types of programs stored in the program storage areas 32A and 62A of the memories 32 and 62 using the CPUs 31 and 61. However, the controller is not limited to the above configurations, and some or all them may be realized by hardware such as an integrated circuit (also referred to as IC (the abbreviation for Integrated Circuit)).

This disclosure can be realized as the MFP 10 and the PC 50 and as well can be realized as a program of executing the processing in the MFP 10 and the PC 50. The program may be provided by a non-transitory recoding medium. The non-transitory recording medium may include a memory, besides a CD-ROM and a DVD-ROM, mounted in a server which can be connected to the MFP 10 and the PC 50 through a communication network. The program stored in the memory of the server may be delivered through a communication network such as the Internet as information or signals indicating said program.

What is claimed is:

1. A non-transitory computer-readable medium having monitor instructions to control an information processing device to perform monitoring, the information processing device including memory, a communication interface connectable to a communication line, and a display,
the monitor instructions causing the information processing device to perform operations comprising:
performing a notification acquisition processing of acquiring, from communication instructions executed by the information processing device, a switching notification indicating a switching from one of a first mode and a second mode to an other mode of the first mode and the second mode, wherein the communication instructions executed by the information processing device uses a logical communication channel provided in the communication line by exclusively switching the first mode and the second mode, the first mode is a mode in which the communication is able to be made by a procedure compliant with a first protocol and the second mode is a mode in which the communication is able to be made by a procedure compliant with a second protocol;
performing a switching processing of setting a mode flag with one of a first value indicating the first mode and a second value indicating the second mode according to the switching notification acquired in the notification acquisition processing;
performing, in a case where the first value is set to the mode flag, a first monitor processing including:
 a first reception processing of receiving first status information indicating a status of the image forming apparatus operated in the first protocol from the image forming apparatus through the communication channel in the first mode by a procedure compliant with the first protocol; and
 a first display processing of displaying the status indicated by the first status information in the display; and
performing, in a case where the second value is set to the mode flag, a second monitor processing including:
 a second reception processing of receiving second status information indicating a status of the image forming apparatus operated in the second protocol from the image forming apparatus through the communication channel in the second mode by a procedure compliant with the second protocol; and
 a second display processing of displaying the status indicated by the second status information in the display.

2. The non-transitory computer-readable medium having the monitor instructions according to claim 1, the monitor instructions causing the information processing device to perform operations comprising:
performing, before the switching, when the switching notification indicating a switching from the first mode to the second mode is acquired in the notification acquisition processing:
 the first monitor processing, and
 a notification output processing of outputting, when the first monitor processing is ended, an allowance notification to allow a switching to the second mode to the communication instructions.

3. The non-transitory computer-readable medium having the monitor instructions according to claim 1,
wherein the memory stores a transitioned flag,
wherein the monitor instructions causes the information processing device to perform operations comprising:
performing, when the switching notification indicating a switching from the first mode to the second mode is acquired in the notification acquisition processing, an initialization processing of setting the transitioned flag with a third value indicating that switching information is not yet received, the switching information being information indicating a timing for the switching from the first mode to the second mode in the image forming apparatus, and
performing, in the second monitor processing:
 when the third value is set in the transitioned flag and status information is received, the first display processing with using the status information as the first status information;
 when the third value is set in the transitioned flag and the switching information is received, a setting processing of setting the transitioned flag with a fourth value indicating that the switching information is already received; and
 when the fourth value is set in the transitioned flag and the status information is received in the second reception processing, the second display processing with using the status information as the second status information.

4. The non-transitory computer-readable medium having the monitor instructions according to claim 1, the monitor instructions causing the information processing device to perform operations comprising:

performing, when the switching notification indicating a switching from the first mode to the second mode is acquired in the notification acquisition processing, a stop instruction processing of transmitting stop instruction information to the image forming apparatus through the communication interface the stop instruction information being information instructing the image forming apparatus to stop generating the first status information, and performing, when the switching notification indicating a switching from the second mode to the first mode is acquired in the notification acquisition processing, a start instruction processing of transmitting start instruction information to the image forming apparatus through the communication interface, the start instruction information being information instructing the image forming apparatus to start generating the first status information.

5. The non-transitory computer-readable medium having the monitor instructions according to claim 1, wherein:

the communication interface is a USB interface to which a USB cable as the communication line is detachably attached, the first protocol is one of a Legacy and an IPP/USB, and the second protocol is the other one of the Legacy and the IPP/USB.

6. A non-transitory computer-readable medium having monitor instructions to control an information processing device to perform monitoring, the information processing device including memory, a communication interface connectable to a communication line, and a display, the monitor instructions causing the information processing device to perform operations comprising:

performing a mode reception processing of receiving mode information indicating whether a communication channel of the communication line is a first mode or a second mode from the image forming apparatus through the communication interface, wherein communication instructions executed by the information processing device uses a logical communication channel provided in the communication line by exclusively switching a first mode in which the communication is able to be made by a procedure compliant with a first protocol and a second mode in which the communication is able to be made by a procedure compliant with a second protocol;

performing, a switching processing of setting a mode flag with one of a first value indicating the first mode and a second value indicating the second mode according to the mode information received in the mode reception processing;

performing, in a case where the first value is set to the mode flag, a first monitor processing including:

a first reception processing of receiving first status information indicating a status of the image forming apparatus operated in the first protocol from the image forming apparatus through the communication channel in the first mode by a procedure compliant with the first protocol; and a first display processing of displaying the status indicated by the first status information in the display; and performing, in a case where the second value is set to the mode flag, a second monitor processing including:

a second reception processing of receiving second status information indicating a status of the image forming apparatus operated in the second protocol from the image forming apparatus through the communication channel in the second mode by a procedure compliant with the second protocol; and a second display processing of displaying the status indicated by the second status information in the display.

7. A non-transitory computer-readable medium having communication instructions to control information processing device, the information processing device including a memory and a communication interface connectable to an a communication line, wherein monitor instructions executed by the information processing device receives first status information indicating a status of the image forming apparatus operated in a first protocol and second status information indicating a status of the image forming apparatus operated in a second protocol from the image forming apparatus by a procedure compliant with a corresponding protocol through a logical communication channel provided in the communication line, the communication instructions causing the information processing device to perform operations comprising:

performing a first notification output processing of outputting, to the monitor instructions, a first switching notification indicating a switching from a first mode in which the communication is able to be made through the communication channel by a procedure compliant with the first protocol to a second mode in which the communication is able to be made through the communication channel by a procedure compliant with the second protocol;

performing a first notification acquisition processing of acquiring, from the monitor instructions, a first allowance notification to allow the switching from the first mode to the second mode;

performing a first switching processing of transmitting, to the image forming apparatus through the communication interface, a first command instructing the switching of the communication channel from the first mode to the second mode when the first allowance notification is acquired in the first notification acquisition processing;

performing a transmission processing of transmitting data compliant with the second protocol to the image forming apparatus through the communication channel in the second mode;

performing a second notification output processing of outputting, to the monitor instructions, a second switching notification indicating a switching from the second mode to the first mode when the transmission processing is ended;

performing a second notification acquisition processing of acquiring, from the monitor instructions, a second allowance notification to allow the switching from the second mode to the first mode; and performing a second switching processing of transmitting, to the image forming apparatus through the communication interface, a second command instructing the switching of the communication channel from the second mode to the first mode when the second allowance notification is acquired in the second notification acquisition processing.

8. The non-transitory computer-readable medium having the communication instructions according to claim 7,
wherein the memory stores a standard printing program provided together with an operating system (OS) of the information processing device to communicate with the image forming apparatus through the communication interface,
the communication instructions causing the information processing device to perform operations comprising:
performing, when the first command is received from the standard printing program, the first notification output processing;
performing, when the first allowance notification is acquired in the first notification acquisition processing, the first switching processing;
performing, when the second command is received from the standard printing program, the second notification output processing; and
performing, when the second allowance notification is acquired in the second notification acquisition processing, the second switching processing.

9. An image forming apparatus comprising:
a printer;
a communication interface connectable to a communication line in which a logical communication channel is provided;
a memory which includes a first area for storing first status information indicating a status of the printer operated according to a first protocol, and a second area for storing second status information indicating a status of the printer operated according to a second protocol; and
a controller,
wherein the controller perform operations comprising:
performing a reception processing of receiving, from an information processing device through the communication interface, a switching command instructing a switching from a first mode to a second mode;
performing, when the switching command is received in the reception processing, a conversion processing of converting the first status information stored in the first area into the second status information which shows the same status as that of the first status information and is compliant with the second protocol;
performing, a storage processing of storing the second status information converted in the conversion processing in the second area;
performing, a switching processing of switching a mode from the first mode to the second mode according to the switching command received in the reception processing, the first mode is a mode in which the communication is able to be made by a procedure compliant with a first protocol and the second mode is a mode in which the communication is able to be made by a procedure compliant with a second protocol; and
performing, a transmission processing of transmitting the second information stored in the second area to the information processing device through the communication channel in the second mode.

10. An image forming apparatus comprising:
a printer which forms an image;
a communication interface connectable to a communication line in which a logical communication channel is provided;
a memory which includes a first area for storing first status information indicating a status of the printer operated according to a first protocol, and a second area for storing second status information indicating a status of the printer operated according to a second protocol; and
a controller,
wherein the controller perform operations comprising:
performing a reception processing of receiving, from an information processing device through the communication interface, a switching command instructing a switching from a first mode to a second mode;
performing, when the switching command is received in the reception processing, a first storage processing of storing the first status information in the second area, wherein the first status information is stored in the first area before performing the first storage processing;
performing a second storage processing of storing, in the second area, switching information indicating a switching from the first mode to the second mode the first status information stored in the first storage processing such that the second area stores both the switching information and the first status information that is stored in the first storage processing;
performing a switching processing of switching a mode from the first mode the second mode according to the switching command received in the reception processing, the first mode is a mode in which the communication is able to be made by a procedure compliant with a first protocol and the second mode is a mode in which the communication is able to be made by a procedure compliant with a second protocol; and
performing a transmission processing of transmitting the first status information and the switching information stored in the second area to the information processing device through the communication channel in the second mode.

11. A non-transitory computer-readable medium having monitor instructions to control an information processing device to perform monitoring, the information processing device including memory, a communication interface connectable to a communication line, and a display,
the monitor instructions causing the information processing device to perform operations comprising:
a reception processing of receiving status information from the image forming apparatus through the communication line; and
a determination processing of analyzing a data structure of status information received in the reception processing to determine whether the status information is a first status information or a second status information, wherein the first status information indicates a status of the image forming apparatus operated in a first protocol and the second status information indicates a status of the image forming apparatus operated in a second protocol;
wherein when it is determined in the determination processing that the status information is the first status information, the monitor instructions causes the information processing device to perform a first display processing of displaying the status indicated by the first status information in the display; and
when it is determined in the determination processing that the status information is the second status information, the monitor instructions causes the information processing device to perform a second display processing of displaying the status indicated by the second status information in the display.

* * * * *

UNITED STATES PATENT AND TRADEMARK OFFICE
CERTIFICATE OF CORRECTION

PATENT NO. : 9,894,243 B2
APPLICATION NO. : 15/278235
DATED : February 13, 2018
INVENTOR(S) : Masatoshi Kadota Page 1 of 1

It is certified that error appears in the above-identified patent and that said Letters Patent is hereby corrected as shown below:

In the Claims

On Column 24, Claim 1, Lines 9-10:
Please delete "information indicating a status of the image forming apparatus operated in the first protocol from" and insert --information, indicating a status of the image forming apparatus operated in the first protocol, from--

On Column 25, Claim 4, Line 13:
Please delete "the communication interface the" and insert --the communication interface, the--

On Column 25, Claim 6, Lines 63-64:
Please delete "information indicating the status of the image forming apparatus operated in the first protocol from" and insert --information, indicating the status of the image forming apparatus operated in the first protocol, from--

Signed and Sealed this
Third Day of July, 2018

Andrei Iancu
*Director of the United States Patent and Trademark Office*